United States Patent
Chang et al.

(10) Patent No.: US 7,920,508 B2
(45) Date of Patent: Apr. 5, 2011

(54) APPARATUS AND METHOD FOR GENERATING SYNCHRONIZATION CHANNEL FOR RELAY STATION IN WIRELESS COMMUNICATION SYSTEM

(75) Inventors: Young-Bin Chang, Anyang-si (KR);
Sung-Eun Park, Seoul (KR);
Chang-Yoon Oh, Yongin-si (KR);
Jae-Weon Cho, Suwon-si (KR);
Hyoung-Kyu Lim, Seoul (KR);
Eun-Taek Lim, Suwon-si (KR);
Sung-Jin Lee, Seoul (KR); Hyun-Jeong Kang, Seoul (KR); Dong-Seek Park, Yongin-si (KR); Pah-Yuh Joo, Seoul (KR); Mi-Hyun Lee, Seoul (KR); Soon-Mi Cho, Seoul (KR); Chi-Woo Lim, Suwon-si (KR); Jung-Je Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 11/891,648

(22) Filed: Aug. 10, 2007

(65) Prior Publication Data

US 2008/0039013 A1 Feb. 14, 2008

(30) Foreign Application Priority Data

| Aug. 11, 2006 | (KR) | 10-2006-0076430 |
| Dec. 22, 2006 | (KR) | 10-2006-0133052 |
| Jan. 9, 2007 | (KR) | 10-2007-0002386 |
| Jan. 19, 2007 | (KR) | 10-2007-0006264 |

(51) Int. Cl.
*H04B 7/212* (2006.01)
(52) U.S. Cl. ........................................................ 370/324
(58) Field of Classification Search ...................... None
See application file for complete search history.

(56) References Cited

U.S. PATENT DOCUMENTS

| 6,208,871 | B1 * | 3/2001 | Hall et al. | 370/335 |
| 2005/0190818 | A1 | 9/2005 | Sunaga et al. | |
| 2007/0159994 | A1 * | 7/2007 | Brown et al. | 370/324 |

FOREIGN PATENT DOCUMENTS

| KR | 1020040018613 A | 3/2004 |
| KR | 1020060002690 A | 1/2006 |

* cited by examiner

*Primary Examiner* — Anh-Vu Ly

(57) ABSTRACT

An apparatus and method for generating an RS SCH in a wireless communication system are provided, in which a base station checks a BS SCH sequence and a mask sequence, and generates an RS SCH sequence by XOR-operating the BS SCH sequence and the mask sequence.

30 Claims, 15 Drawing Sheets

APPARATUS AND METHOD FOR GENERATING SYNCHRONIZATION CHANNEL FOR RELAY STATION IN WIRELESS COMMUNICATION SYSTEM

CROSS-REFERENCE TO RELATED APPLICATION(S) AND CLAIM OF PRIORITY

This application claims priority under 35 U.S.C. §119 to an application filed in the Korean Intellectual Property Office on Aug. 11, 2006 and assigned Serial No. 2006-76430, an application filed in the Korean Intellectual Property Office on Dec. 22, 2006 and assigned Serial No. 2006-133052, an application filed in the Korean Intellectual Property Office on Jan. 9, 2007 and assigned Serial No. 2007-2386, and an application filed in the Korean Intellectual Property Office on Jan. 19, 2007 and assigned Serial No. 2007-6264, the contents of which are hereby incorporated by reference as if fully set forth herein.

FIELD OF THE INVENTION

The present invention relates generally to an apparatus and method for communicating using a Relay Station (RS) in a wireless communication system, and in particular, to an apparatus and method for generating a Synchronization CHannel (SCH) for a relay station in a multi-hop relay wireless communication system.

BACKGROUND OF THE INVENTION

In Fourth-Generation (4G) mobile communication systems, cells are configured to have very small radiuses in order to enable high-speed communications and accommodate a larger number of calls. Centralized network design is not viable for the 4G mobile communication systems. Rather, a wireless network should allow for distributed control and implementation and cope actively with an environment change, such as addition of a new Base Station (BS). That is why the 4G mobile communication systems require a self-configurable wireless network that is automatically or distributedly configurable without control of a centralized system.

For real deployment of the self-configurable network, technologies used for an Ad Hoc network are introduced to the 4G communication systems. That is, a multi-hop relay scheme used for the Ad Hoc network is adopted for a wireless network with fixed base stations.

Since communications are conducted between a fixed BS and a Mobile Station (MS) usually via a direct link, a highly reliable radio communication link can be easily established between them in a wireless communication system. However, the fixedness of base stations impedes flexible wireless network configuration, which makes it difficult to provide efficient services in a radio environment experiencing a fluctuating traffic distribution and a great change in the number of required calls.

To avert this problem, a relay scheme is adopted in which data is conveyed through multiple hops via neighbor mobile stations or neighbor relay stations. The multi-hop relay scheme facilitates fast network reconfiguration adaptive to an environmental change and renders the overall wireless network operation efficient. Also, a radio channel with better quality can be provided to a mobile station by installing a relay station between the base station and the mobile station and thus establishing a multi-hop relay path via the relay station. What is better, high-speed data channels can be provided to mobile stations in an area where communications with the base station are unavailable, and cell coverage is also expanded.

FIG. 1 illustrates the configuration of a typical wireless relay communication system.

Referring to FIG. 1, a mobile station 110 within the service area 101 of a base station (BS) 100 communicates directly with the base station 100. On the other hand, a mobile station 120, which is located outside the service area 101 of the base station 100 and thus placed in a poor channel status, communicates with the base station 100 via a relay station (RS) 130.

Through the RS 130, the base station 100 can communicate with mobile stations that are located in a shadowing area, which has severe shielding effects due to buildings, for example, and thus, which offers a poor channel status.

FIG. 2 illustrates a frame structure for a conventional wireless relay communication system.

Referring to FIG. 2, a frame is divided into a downlink sub-frame 200 and an uplink sub-frame 230.

The downlink sub-frame 200 includes a first zone 210 in which a base station provides a service via a direct link and a second zone 220 in which a relay station provides a service via a relay link.

Accordingly, the base station configures a BS downlink subframe to be transmitted to a relay station or a mobile station connected to the base station via a direct link in the first zone 210. The BS downlink subframe is composed of a preamble 211, a control channel 213, and downlink bursts 215.

The relay station configures an RS downlink subframe to be transmitted to a lower relay station or a mobile station connected to the relay station via a relay link in the second zone 220. The RS downlink subframe is composed of a preamble 221, a control channel 223, and downlink bursts 225.

The uplink sub-frame 230 includes a first zone 231 for direct-link communications with the base station and a second zone 233 for relay-link with the relay station.

Accordingly, a relay station or a mobile station connected to the base station via a direct link configures a BS uplink subframe in the first zone 231 in order to transmit control information and traffic to the base station. An MS connected to a relay station via a relay link configures an RS uplink subframe in the second zone 233 in order to transmit control information and traffic to the relay station.

A guard region called a Transmit/receive Transition Gap (TTG) 240 is interposed between the downlink subframe 200 and the uplink subframe 230, and a guard region called a Receive/transmit Transition Gap (RTG) 250 is interposed between frames.

This frame structure brings different frame timings to mobile stations depending on what entity (e.g., BS or RS) provides services to them. For example, when a base station serves a mobile station, the mobile station receives a service in the BS downlink subframe in the first zone 210. If a relay station serves the mobile station, the mobile station receives a service in the RS downlink subframe in the second zone 220.

As described above, if mobile stations have different frame timings according to an entity that serves them, handover and synchronization are difficult to achieve.

SUMMARY OF THE INVENTION

An aspect of the present invention is to substantially solve at least the above problems and/or disadvantages and to provide at least the advantages below. Accordingly, an aspect of the present invention is to provide an apparatus and method for enabling mobile stations to operate synchronously in a multi-hop relay wireless communication system.

Another aspect of the present invention is to provide an apparatus and method for configuring an SCH for a relay station in a multi-hop relay wireless communication system.

A further aspect of the present invention is to provide an apparatus and method for configuring an SCH for a relay station using a sequence of a length equal to or different from a sequence of a synchronization channel for a mobile station in a multi-hop relay wireless communication system.

Still another aspect of the present invention is to provide an apparatus and method for improving the Peak-to-Average Power Ratio (PAPR) performance of an SCH for a relay station in a multi-hop relay wireless communication system.

According to an aspect of the present invention, there is provided a method for generating an SCH in an upper node in a wireless communication system, in which the upper node checks a sequence of a first SCH for a mobile station and a mask sequence, and generates a sequence of a second SCH for a relay station by XOR-operating the first SCH sequence and the mask sequence.

According to another aspect of the present invention, there is provided an apparatus for generating a second SCH for a relay station in a wireless communication system, in which a storage stores a sequence of a first SCH for a mobile station and a mask sequence, and an SCH generator generates a sequence of the second SCH by XOR-operating the first SCH sequence and the mask sequence.

According to a further aspect of the present invention, there is provided a method for acquiring an SCH in a relay station in a wireless communication system, in which the relay station checks a sequence of a first SCH for a mobile station received from an upper node and a mask sequence, generates a sequence of a second SCH by XOR-operating the first SCH sequence and the mask sequence, and acquires, upon receipt of a second SCH from the upper node, synchronization to the upper node by correlating the generated second SCH with the received second SCH.

According to still another aspect of the present invention, there is provided an apparatus for acquiring an SCH in a relay station in a wireless communication system, in which a storage stores a sequence of a first SCH for a mobile station received from an upper node and a mask sequence, an SCH generator generates a sequence of a second SCH by XOR-operating the stored first SCH sequence and the stored mask sequence, a receiver receives a second SCH from the upper node, and a correlator correlates the generated second SCH with the received second SCH.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

FIGS. 1 through 15, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for generating an SCH for a relay station in a multi-hop relay wireless communication system. The SCH for a relay station refers to an SCH that a base station or an upper relay station transmits to a lower relay station, for synchronization acquisition.

While the present invention is described herein in the context of an Orthogonal Frequency Division Multiple Access (OFDMA) wireless communication system, it is clearly to be understood that the present invention is also applicable to wireless communication systems using other communication schemes.

Figure 1:
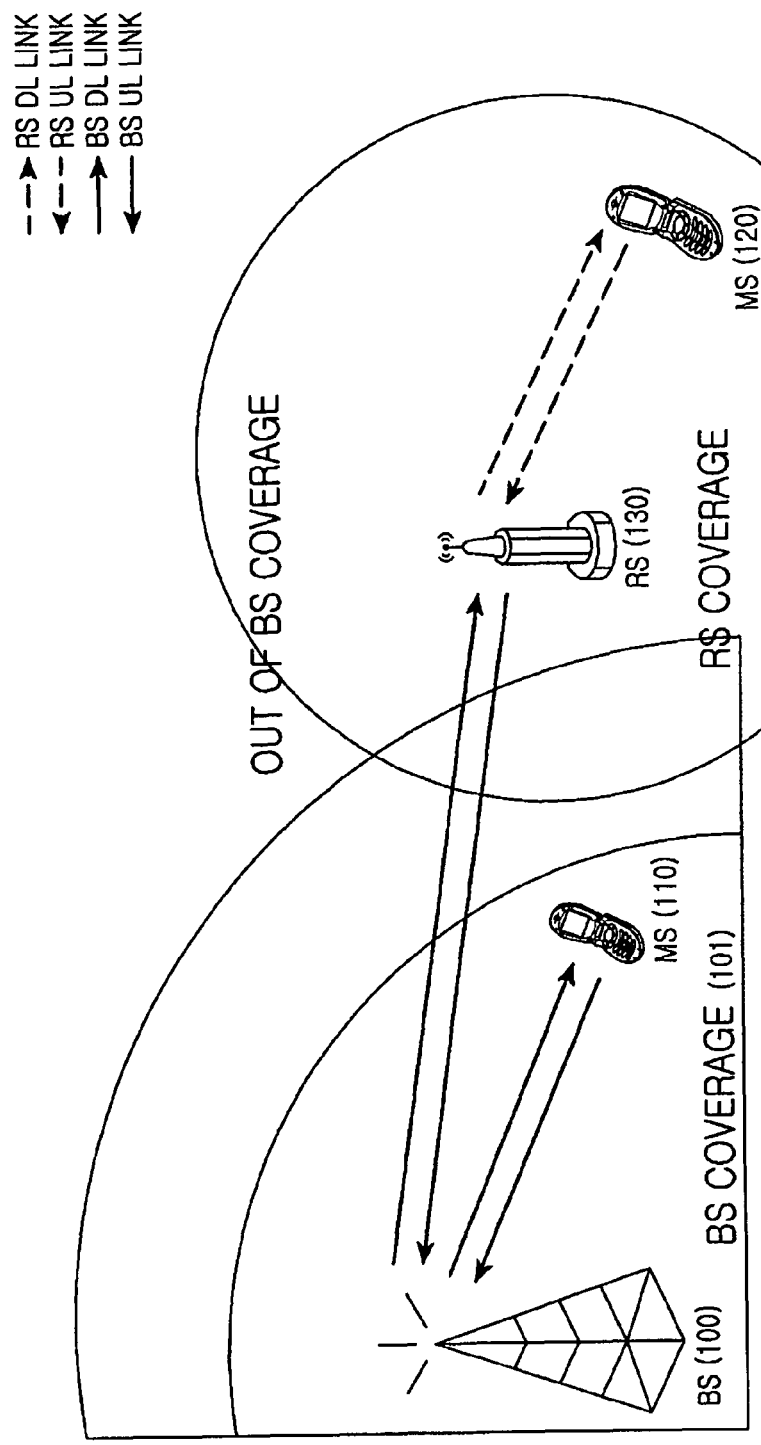
FIG. 1 illustrates the configuration of a typical wireless relay communication system.
Figure 2:
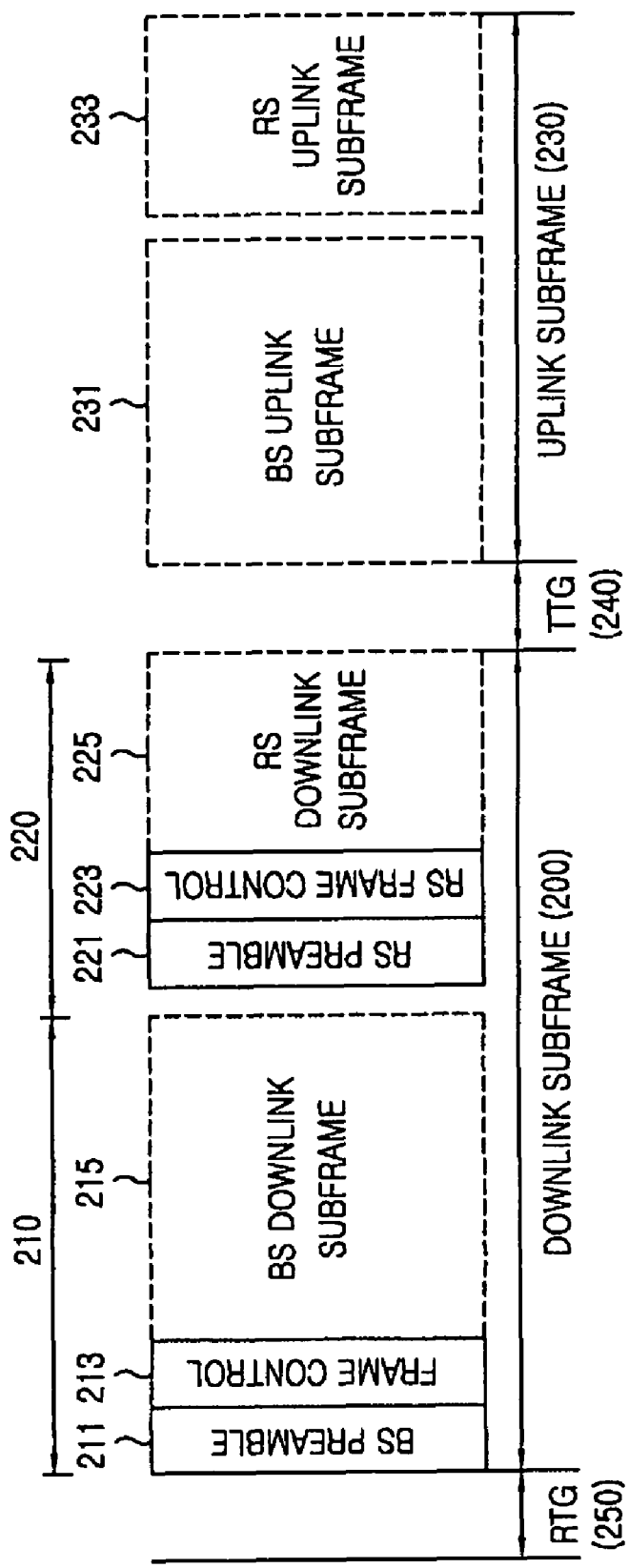
FIG. 2 illustrates a frame structure for a conventional wireless relay communication system.
Figure 3:
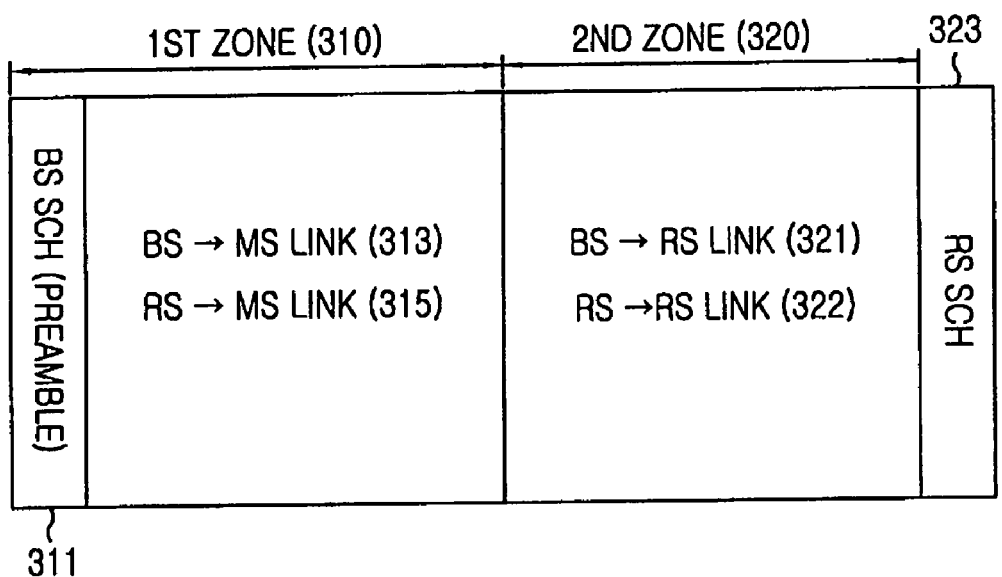
FIG. 3 illustrates a frame structure for a wireless communication system using a relay scheme according to an embodiment of the present invention.

The wireless communication system uses the frame structure illustrated in FIG. 3 so that mobile stations acquire frame timing. Hereinbelow, an SCH that a base station or a relay station transmits to a mobile station for synchronization acquisition and maintaining is called a BS SCH, and an SCH that a base station or an upper relay station transmits to a lower relay station for synchronization acquisition and maintaining is called an RS SCH.

FIG. 3 illustrates a frame structure for a wireless communication system using a relay scheme according to an embodiment of the present invention. The frame structure will be described in terms of a downlink subframe, and downlink bursts include control information.

Referring to FIG. 3, the downlink subframe includes a first zone 310 and a second zone 320.

A BS or a relay station configures a subframe in the first zone 310 to transmit a BS SCH 311 and traffic to mobile stations within its service area. Specifically, the base station configures a subframe 313 for a BS-MS link (for short, a BS-MS subframe) and the relay station configures a subframe 315 for an RS-MS link (for short, an RS-MS subframe) in the first zone 310. The BS-MS subframe 313 and the RS-MS subframe 315 can be transmitted in Space-Division Multiplexing (SDM), Frequency-Division Multiplexing (FDM), or Orthogonal Frequency Division Multiplexing (OFDM). Since the base station and the relay station simultaneously transmit the BS SCH 311 and traffic to mobile stations within their service areas, the mobile stations can synchronize to frame timing.

The mobile stations can acquire time-frequency synchronization and perform channel estimation using a synchronization signal received on the BS SCH 311 in the first zone 310.

The base station or the upper relay station configures a subframe in the second zone 320 to transmit an RS SCH 323 and traffic to lower relay stations. If the wireless communication system spans two hops, the base station configures a subframe 321 for a BS-RS link (for short, a BS-RS subframe) in the second zone 320. For three or more hops, the base station configures the BS-RS subframe 321 and an upper relay station configures a subframe 322 for an RS-RS link (for short, an RS-RS subframe) in the second zone 320. The BS-RS subframe 321 and the RS-RS subframe 322 can be transmitted in SDM, FDM, or OFDM.

The lower relay stations acquire initial synchronization and register to the base station or the upper relay station in the first zone 310. After the registration, the lower relay stations receive downlink bursts and the RS SCH 323 from the base station or the upper relay station in the second zone 320. For signal relaying, the lower relay stations transmit the BS SCH 311 to mobile stations within their service areas in the first zone 310 and receive the RS SCH 323 from the base station or the upper relay station in the second zone 320. The lower relay stations can acquire time-frequency synchronization and perform channel estimation using a synchronization signal received on the RS SCH 323.

As described above, the base station and the upper relay station provide a BS SCH for mobile stations and an RS SCH for lower relay stations. To distinguish the BS SCH from the RS SCH, they carry different SCH signals. In other words, the base station and the upper relay station transmit different SCH sequences on the BS SCH and the RS SCH. It is assumed herein that an SCH sequence is a Pseudo Noise (PN) sequence with the lowest PAPR.

Since the base station and the upper relay station should calculate PN sequences with the lowest PAPR twice to create the BS SCH and the RS SCH that have different synchronization sequences, the complexity of generating the SCHs increases.

A method for reducing the complexity of configuring an SCH in the wireless communication system will be described below. Particularly, a method for generating an RS SCH using a BS SCH in the base station and the upper relay station will be described. While the base station generates an RS SCH in the following description, the same thing applies to the upper relay station. Also, a typical SCH used for synchronization acquisition between a transmitter and a receiver can be created in the same manner.

Figure 4:
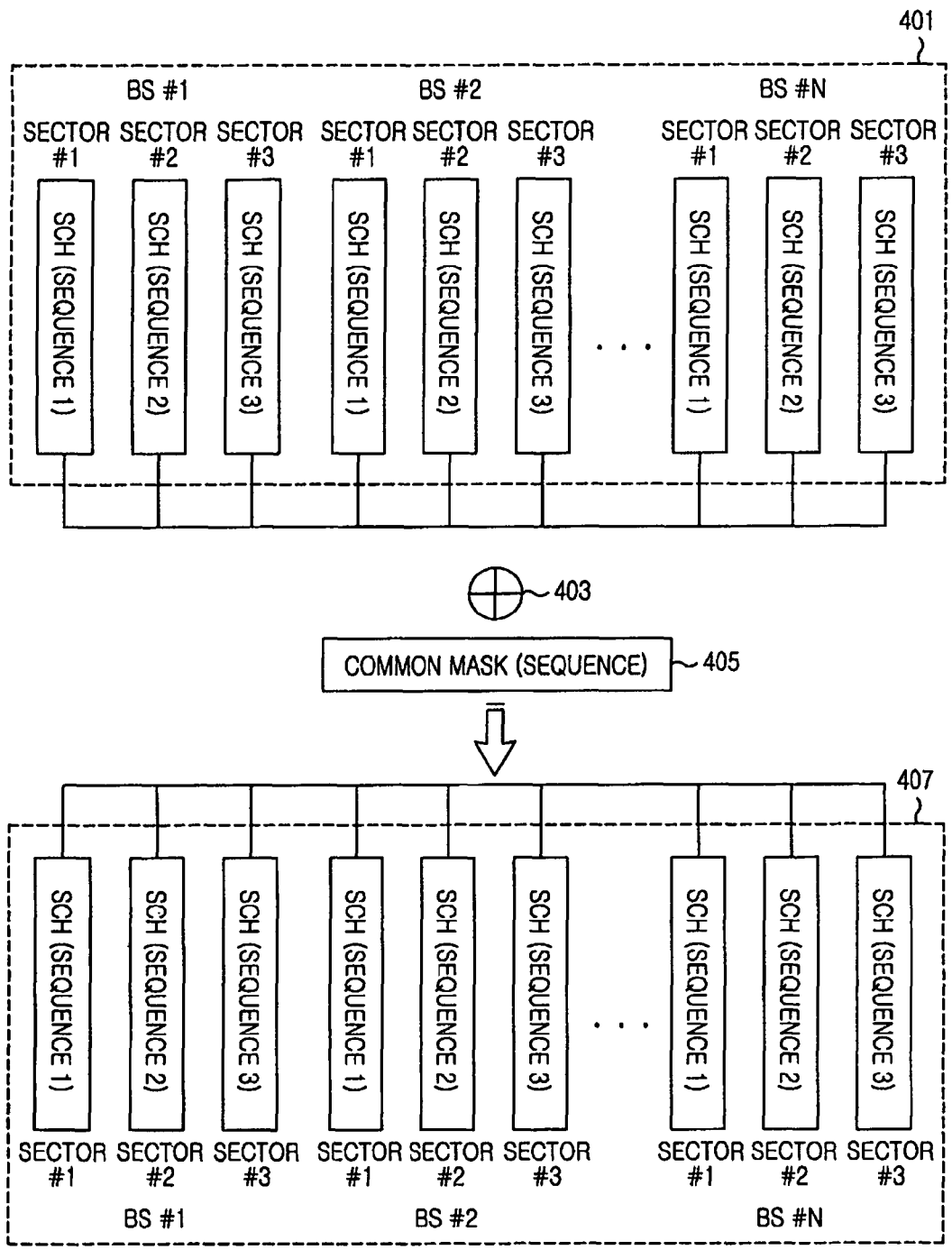
FIG. 4 illustrates a method for generating an SCH for a relay station in a base station in the wireless communication system according to an embodiment of the present invention.

FIG. 4 illustrates a method for generating an RS SCH in the base station in the wireless communication system according to an embodiment of the present invention. The following description is made under the assumption that the service area of one BS is divided into three sectors and one SCH is defined for each sector.

Referring to FIG. 4, the wireless communication system has N base stations. Since each BS covers three sectors, the wireless communication system uses a total of 3N BS SCHs 401.

The N base stations XOR-operate the sequences of the BS SCHs 401 with the sequence of a common mask 405, as indicated by reference numeral 403. A sequence that minimizes the PAPRs of RS SCHs 407 resulting from XOR operation of the sequence and the BS SCHs 401 is selected as the common mask sequence 405. The common mask sequence 405 may have a length equal to or different from that of the sequence of a BS SCH 401.

As described above, the base station generates RS SCHs by XOR-operating BS SCHs with the common mask. Cross correlation characteristics between the sequences of the RS SCHs are the same as those of the BS SCHs, as illustrated in FIG. 13.

Figure 13:
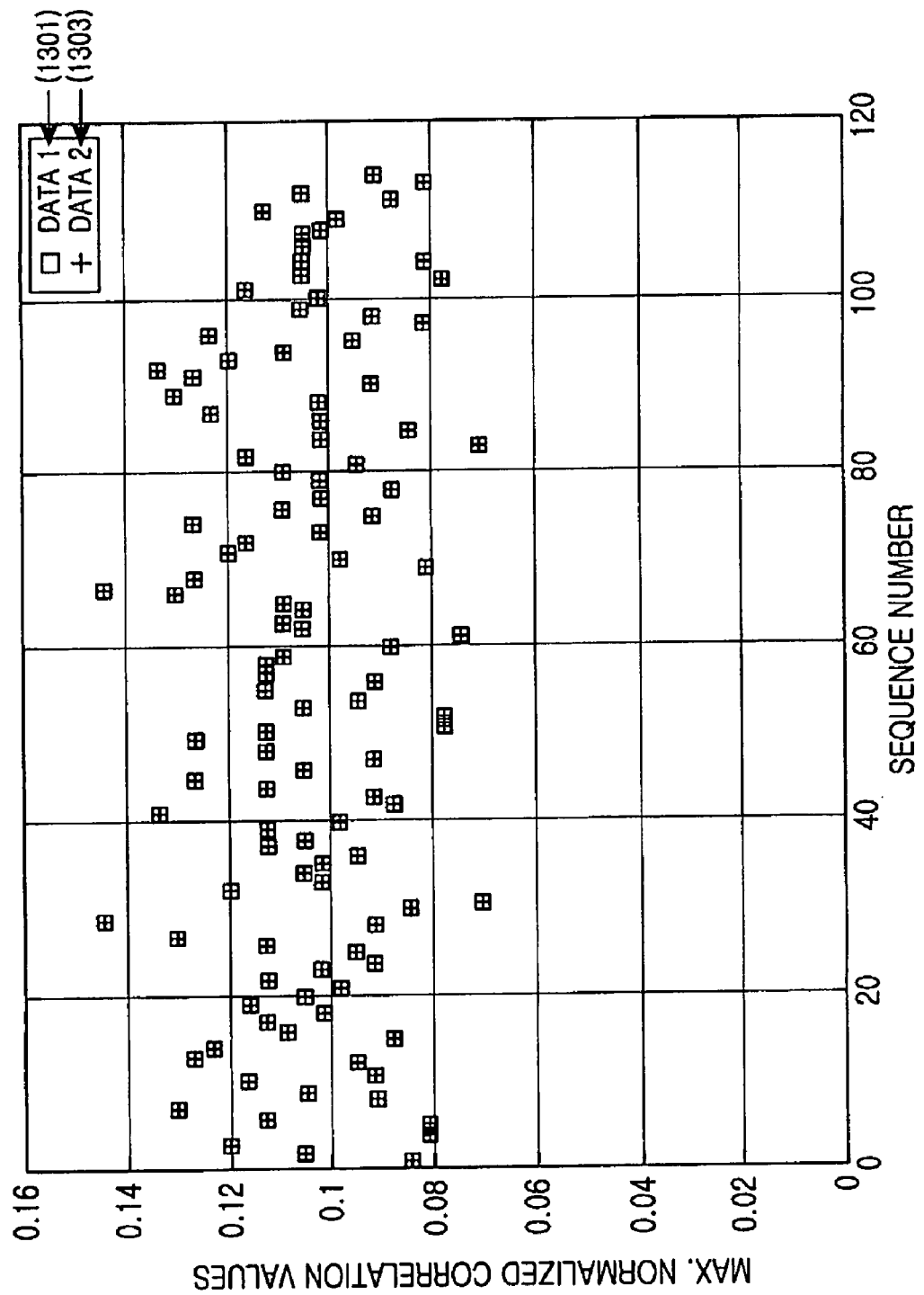
FIG. 13 is a performance graph according to an embodiment of the present invention.

FIG. 13 is a performance graph according to an embodiment of the present invention. The horizontal axis represents sequence numbers and the vertical axis represents cross correlation values between sequences when auto correlation values are normalized with respect to 1.

Referring to FIG. 13, the cross correlation characteristics between RS SCH sequences generated using BS SCH sequences are the same as those between the BS SCH sequences. In order to represent the cross correlation characteristics between SCH sequences, data 1 1301 denotes a maximum cross correlation value between each BS SCH sequence and the other BS SCH sequences and data 2 1303 represents a maximum cross correlation value between each RS SCH sequence and the other RS SCH sequences.

As noted from the graph, the maximum cross correlation values of sequences included in data 1 and data 2 are same. Thus it is concluded that the cross correlation characteristics between the RS SCH sequences are the same as those between the BS SCH sequences.

Also, the cross correlation characteristics between the BS SCH sequences and the RS SCH sequences are the same as those between the BS SCH sequences.

Figure 14:
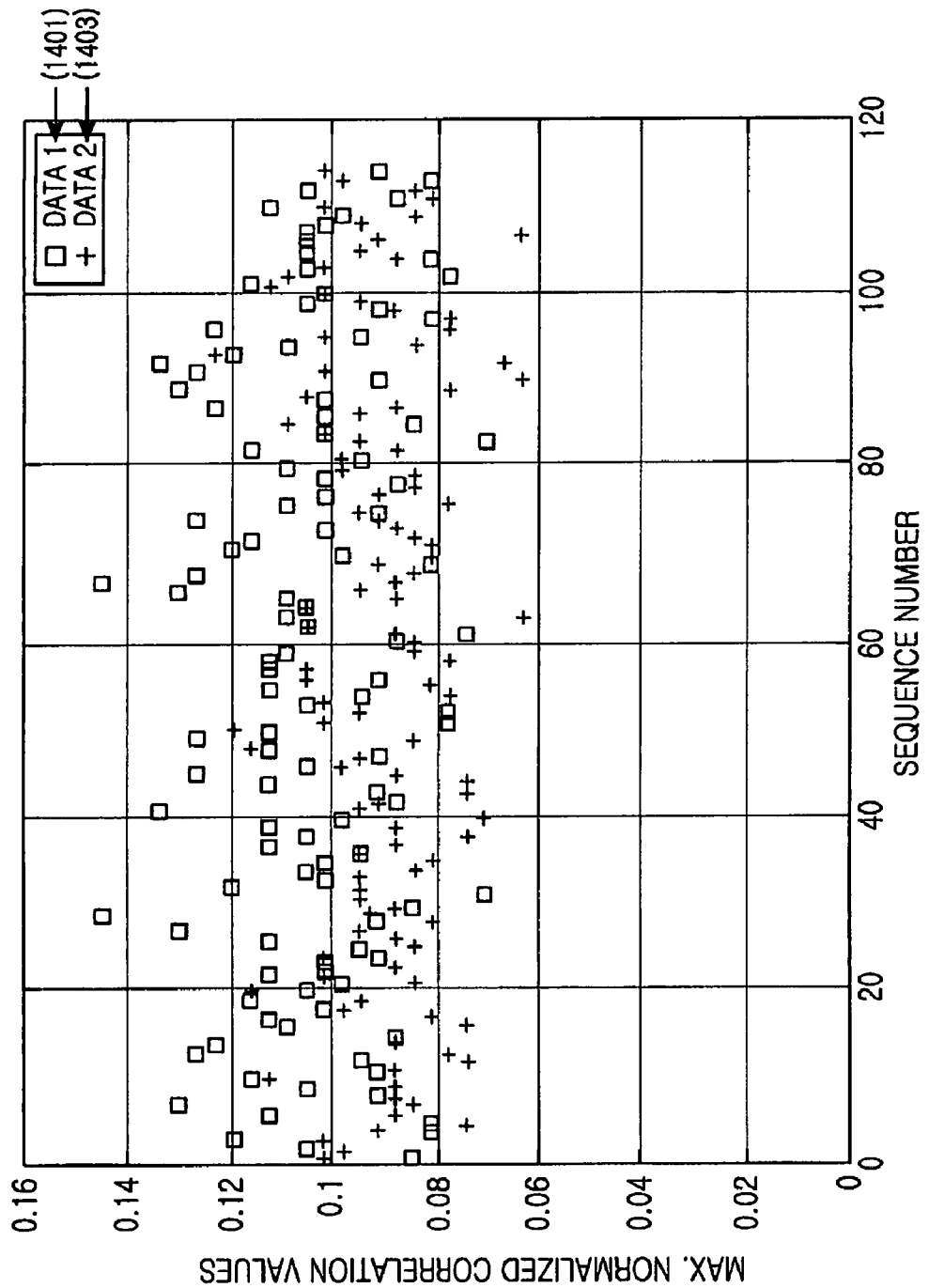
FIG. 14 is a performance graph according to another embodiment of the present invention.

FIG. 14 is a performance graph according to another embodiment of the present invention. The horizontal axis represents sequence numbers and the vertical axis represents cross correlation values between sequences when auto correlation values are normalized to 1, that is, the maximum of cross correlations between each sequence and the other sequences.

Referring to FIG. 14, the cross correlation characteristics between the BS SCH sequences and the RS SCH sequences are the same as those between the BS SCH sequences. In order to represent the cross correlation characteristics between SCH sequences, data 1 1401 denotes the maximum of cross correlation values between each BS SCH sequence and the other BS SCH sequences, and data 2 1403 represents maximum cross correlation values between the BS SCH sequences and the RS SCH sequences. For example, data 2 denotes the maximum of cross correlation values between a first RS SCH sequence and the BS SCH sequences.

As noted from the graph, the maximum cross correlation values in data 1 are lower than those in data 2. Thus it is concluded that the cross correlation characteristics between the BS SCH sequences and the RS synchronization sequences are better than or equal to those between the BS SCH sequences.

If the wireless communication system complies with Institute of Electrical and Electronics Engineers (IEEE) 802.16, it uses the following preamble sequences shown in Table 1 below as BS SCH sequences.

TABLE 1

| sequence number | Sequence |
|---|---|
| 1 | 11-1-1-1-1-11-1-11-11-111-11111111-1111-1-111-111-111-1-1111111111-111-1-1-11-11-1-11-111-111-11-11-11-1111111-11-1-1111-11-111-11-11-1-1-1-11-11-1-111-1-1-1-11-111-11111-11-1-1-1111-111-11-1-1-1-1-11-111-1-1-1-111111-11-11-1-1-111-1-111-111-1-1-1-1-11111-111-11-1-11-111111-1-1-11-1-1-11-11-1-1-1-1111-11-111-1-1111-1-11-11111-11-111-1-1111-1-1-1-11-11111-1111-111-1-1-11-11-1-1-11-1-11-111-1-1-111111-1-1-1-1-1-111-1-1111-11-1111-111-1-111-11-1-11-111-1-1111-1-1-111-1-1111-111-1-1-1-11111-1-1-1-11-1-1-11-11-11-1-11111-1-1-1-1-1-1111111-1-1-111-1-1-1-11-11111-11111-1-11-1-11111-1-1-11-111-1-1111-111-1-11111-11111-111-1-1-1-1-11-1-11-1-1-1-11-11-1111-1-11-1-1-11-1-1-1-11-111-111-1-11-1111-11-11-1-1111-1-1111111-1111-1-11-1-1-11-11-1111-111-1-1-1-1-1-11-1-1-1-1-11-1-1-1-1-111-1-1111-111-1111-111-1-1-1-11-111-1-1-1-11-1-11-1-1-1-1-111 |
| 2 | 1-11-11-1-111111-11111-11-111-1-1-1-1-1111-11111-11-1-1-1-11-11-1-11-1-11-11111-11-111-11-1-11-11-1-111-11-1-111111-111-1111-1-1-1-11-11-1-111-1-11-1-1-1111-1-111-1-1-1-1111-111-1-11-111-11-1-11-1-11-1-11-1111111-1-11-1-111-11-11-1-1-11-1-1-111-11-1-1-111-111111-1-1-111-111-111-1-111-1111-1-1-1-1-11-1-1-1-1-1-11-111-1-1111-111-11-1-1-11-1-11-1111-11-1-11111-1-1-1-1-111-11-11-1-1-1-1-11-1-1-1111-1-111-11-11-11-111-1-1-111-1-1111-111-1111-1-1-111-1-11-1-1-1-1-11-11-11-1-11-1-1111-1-1-11-11-11-1-11-11-11-1111-11-1-1-1-1111-1-1-1-1-1-1-11111-1-1-111-11-1-1-11-1-111-111-111-1-1-1-1-1-11-1-11-1-1111-1-11-1-1-1111-11111111-1-1-1-1111-111-111-11-11-1-1-11111-11-11-111-1-1-1111-1-1-11-1-1-1-1-1-111-11111-1-1-1-111-11-1111-1-1-1-1111-11-111111-1-1-111111-1-1-1-1-1-1-1-1-1-111-11111-1111-11-111-111-11-11-1-1-1-11-111-11-11-1-111-111111-11 |
| ... | ... |
| 114 | -1-1-11-11111111-1-1-111111-11-1-11-11-11-1-111-111-11-1-111111-1-1-1-11-111-11-1111-1111-111-1-1-1-1-1-11111-1-11-11-1-11-1-1-111-1-1-1-1111-1111-1-11-1-111-1-1-1-1111-1111-1-1111-1-1-11-111-1-11-111-1-11-1-1-1-1-11111-11111-1-1-11-1-1-11-111111-1-1-1-1111-1-1-11-1-1-1-1-1-1-1-11-11111-1-111-1-1-1111-11-111-11-1111-11-1-1-11-1-11111-11-111111-1-1-1-11-11-1-1-11-11-1-1-1111-1-1-1-1-1-11-1-1-11-1111-1-1-11-1-1111-1-11-11-1-1111-1-11-1-1-1-1-1-11-11-1111-1-111-11-1111-1-1-11-111-1111-111-11-1-1-1-111-1-11-111-1-1-1111-1-1-111-11-1-111-1-1111-1111111-1111-1-11-1-111-1-1-111-1-11-1-11-11-1-111111111-1-111-11-1111-1-11-1-11-1-111-11-11111-11-1-1-1-1111111-1-11-11-1-1-1111-11-1-1-1-111-1-1-1-11-1-11111-111-1-1-11-11-1-1-11-111-11-11111-1-1-1-1111-11-1-1-1-11-111-1-1-111-11-11-1-1-1111-1111-11-1-1-1-11-1-11-11-11111-1-1-1-1-1-11111-11-11-11-11-1-1-1-1-11-111-1-111-1 |

Referring to Table 1, the IEEE 802.16 system uses 114 BS SCHs each of length 568. Assuming that the base stations adopt Binary Phase Shift Keying (BPSK), the BS SCHs have sequences of 1s and −1s by substituting is for 0s and −1s for 1s.

To generate RS SCHs using the BS SCHs listed in Table 1, the following common mask sequence is used in the IEEE 802.16 system.

TABLE 2

| Common mask | Sequence |
|---|---|
| 1 | 1-1-111111-11-11-1-11-11-11-11-11-1-1-1-1-1-1-1-1-1111-1111111-1-1-1111-1-1-111-1-1-11-11-11-1-1111-1-1-1-1-11-11-11-1-11-11-1-1111-111-111-1111-1-111-11-1-11-1-1-1-1-11-111-11-111-1-1-111-1-11-1-1-1-1-1-111-1-1-1-111-11-1-1111-111-111111-1-11-11-1-1-1-1-1-11-1-1111-1-1-11-111-1-1-1-1111-1111-1111-11-1-1-11-111-1-1-1-11-1-1-111-111-1-1-11-11-11-1-1-1111-11- |

TABLE 2-continued

| Common mask | Sequence |
|---|---|
| | 11-111-1-1-1-11-11-11-1-11111-111-1111-111-1-11-1111-111-1-11-11111-1-<br>11-11111-1111-1-111111-1-11-11-1-1-1-1-11-1-1111-111-1-11111-111-1-1-1-11111-<br>1-11-1-1-1-11-111-1-1-11-1-1-111-11-1-111-1-1-11-1-11-1-1-111-1111-11111-<br>1-1111-11-111-11-1-1-111-11-111-111-1-11-11111-1-1-11-11-1-1-1-11-111-<br>11-11111-1-1-11111-1111-1-1-1-11-11-11-1-1-1-1-1-11-1-11-1-1-1-1-1-<br>1-11-11-1111-1-11111-111-1-1-11-11-1-1-1-11-1-1-11-1-1-1-111-1111-111111-<br>1-1-1-11-11-11-11-1-1-11-1-1-11-1-1-1111-1-111-11111 |

In Table 2, the common mask has a sequence of length 568 like a preamble sequence shown in Table 1. The common mask sequence characteristically minimizes the PAPRs of the RS SCHs resulting from XOR-operation between the common mask sequence and the BS SCH sequences.

The XOR-operation between the common mask sequence of Table 2 and the BS SCH sequences of Table 1 produces the following RS SCH sequences listed in Table 3 below.

TABLE 3

| Sequence number | Sequence |
|---|---|
| 1 | 1-11-1-1-1-111-1-1-1-111-1-1-11-11-11-11-1-1-111-1-1-111111-1-111-1-1-1111-11-<br>11-111-1-1-1-1111-11-11-11-11-1-1-1-1-11-1-11-1-1-11-111-1-1111111-1111-1-1-<br>1-1-11-1-1-1111-111-1-11111-1-111-1111-1-11-1-111-111111-1-1111-111-11111-11-<br>1-11-111-1-111-1-11-11111-1-11-11-11-1-111111-1-1-11-1-111-1-1111-1-1-11-<br>1-1111-1-1-1111-1111-1-111-11-1-1-111-1-1-1-1-1-11111-1111-1-1-1-1-111-11-1-<br>11-111-1-1-1-1-1111111-1-1111-1-1-111-1111-1-1-1-1111-111-1-1111111-11-11-1-<br>1-1111-1-1-1-1111-1-1-1111-11-1-1-1111-1-111-1-11-11111-11-1-1-1-1-1-1-11111-<br>1-1111-1-1111-111-1-1-1-1111-111111-1-1111-11-11-111-1111-1-1-11-1-<br>11-11-11-11-111-1-111-1-1111111-111-11-11-111-1-1-1-11-11-11-1111-1-1-1111-1-<br>11-11-1-1-1-1-11111-1-1-111-11-11-11-1-1-1-1-11-11-111-111-111-1-11-11111-11-<br>1-111111-11-1-1-1-11-1-111-11-1-1-1-11-1-1-11111-1-11-11111-11-11-1-1-11-1-111 |
| 2 | 11-1-11-1-11-111-11-111111-1-11111-1-1-1-111-1-1-1-1-1-1-11-1-1-1-111-<br>11-1-1-1111111-1111-1-1111-1-11-1-11111-1111111-1-111-1-1-1-11-11-111-11-11-<br>111-1-1-11-1-1-11-1-11-11111-1-1-1-1-1111-1111-11-11-111-11-11-11-111111-11-<br>1-11-1-11-1-1-111-1-1-1111-1-1-1111-1-1-1-11-1-11-1-1-11-11-1-1-11-11-11-1-11-<br>111-1-11-1-1111-1-1-1-11-11-1-11-11-1-1-11-1-1-11-11111111-1-11111111-1-1-1-111-<br>1-11-1-11-1-1-1-1-1-11-11-1111-1111-1-1-1-11-111-11-11-1-111-1-111-11111-<br>1-1111-11-1-11-11-1-1-1-11-11111-11-1-1-1-1-11-111-111-111-11111111111111-<br>1-11-1-1-111111-1-1-1-1-111-111-111111-11-11-1-1-11-111-11111-1111-1-1-<br>1-1111-111-11111-111-111-1-11-111111111-1-1-1-1-11-11-1-1-111111-111-1111-<br>1111-1-111-1-111111-1-11-1-1-11-1-1-1-11-111-11111-1-1-1-1-1-1-111111-111-<br>1111-11-1-11111111-111-1-111-1-1-1-1-1111111-1-1-1-11-1-1-11-1111-111-11 |
| ... | ... |
| 114 | -1111-1111-11-1111-1-11-11-1-1-11-11-11-111-11-11-1-11-1-111-1-1-1-1-11-11111-<br>111-1111-1-1-11111111-1-11-1111111111-1-11111-1-111111-1-111111-1-11-1-1-<br>11111111-1-1-11111-11111-1-11-1-1111-11111-11-11-11111-1-1-111-1111-1-1-11-<br>111-1-111-1-1111-111-1-1-11-1111-11-1-1-1-1-1111-111-1-11-1-11-1111-1-1111-1-1-111-<br>11-1-111-1-111-1-11-1-1-1-1111-11-1-1-11-1111-1111-11-1-1-1111-111-1-1-111-<br>1-1-111-11-1-1-1-1-11-11-11-1-11-1-1-1-1111111-1111-1-11111-11-1-1-1-111-<br>1-1-111-111-1-11-11-11-11-1-1-11-1-1-1-1-11-11-1-111-1-1-1111-1-11-1-1-1-<br>11-11111-11-1-1-11-1-11-111-11111-111111111-1-1-1-1111-1-1111-111-1-11111-1-<br>1-1-1-1-1-1-1-1-11-1111-1111-1-1-11-1-11-1-111-11-1-1-111-1-1-1-1-1-1-1-111-<br>1111-1111-1-1-1-1-11-1-1-1-1111-111-11-1111-1-11-1-11-111-11111-111-1-1-1-1-<br>1-1-111-111-111-11-1-1-111111111-111-11-1-1-11-1-1-11-1-1-111-1-1-1-11111-111- |

The cross correlation characteristics between the RS synchronization sequences are the same as those between the BS synchronization sequences. The cross correlation characteristics between the RS synchronization sequences and the BS synchronization sequences are the same as those between the BS synchronization sequences, as shown in FIG. 14.

However, the base station cannot predict the PAPRs of the RS SCH sequences, and the PAPR performance of the RS SCH sequences is lower than that of the BS SCH sequences. Hence, the base station modifies the RS SCH sequences in the manner shown in FIG. 5 to improve their PAPR performance.

Figure 5:
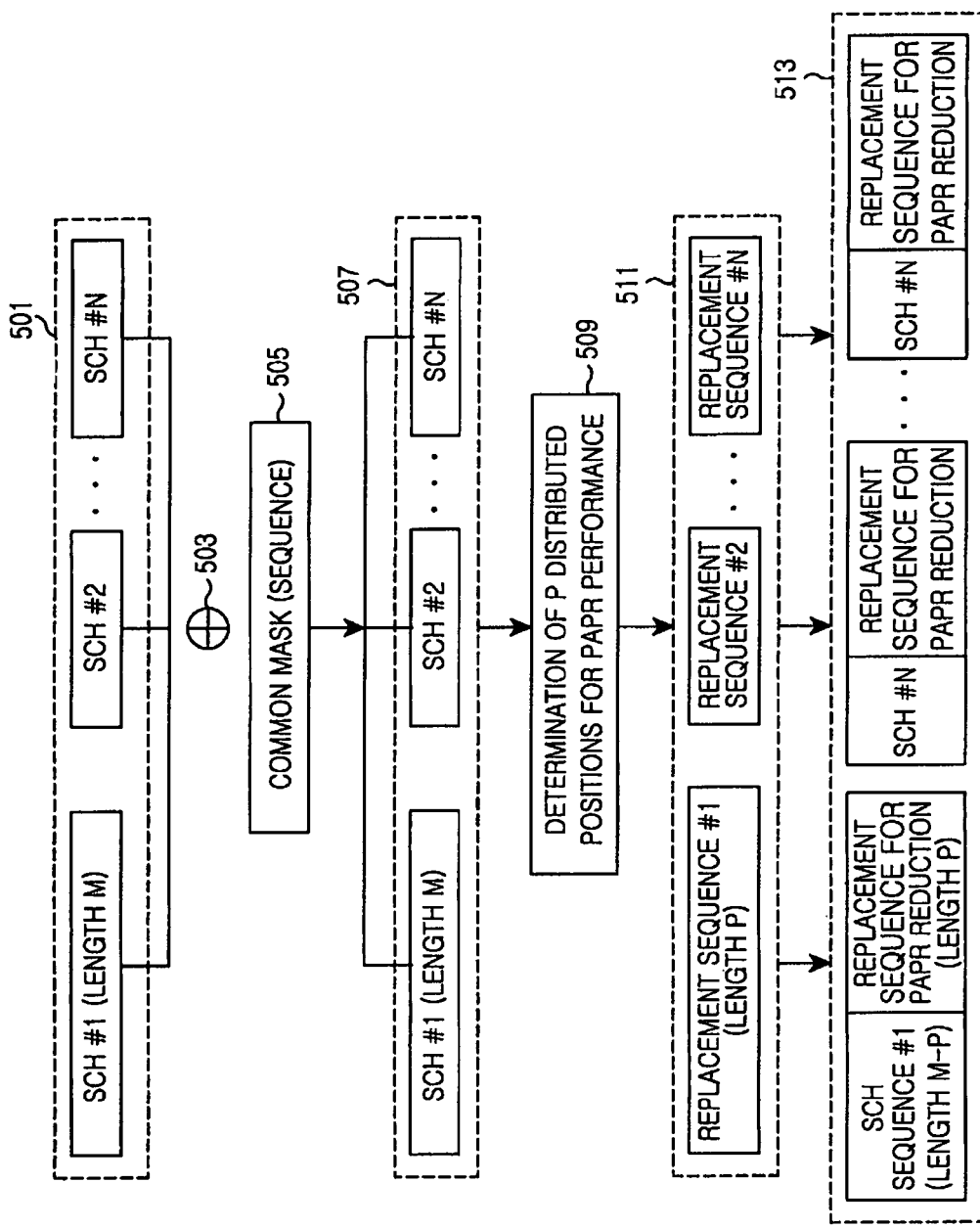
FIG. 5 illustrates a method for improving the PAPR performance of an SCH for a relay station in the base station in the wireless communication system according to an embodiment of the present invention.

FIG. 5 illustrates a method for improving the PAPR performance of an RS SCH in the base station in the wireless communication system according to an embodiment of the present invention.

Referring to FIG. 5, there are N BS SCHs 501, each of length M. The base stations generate N RS SCHs 507, each of length M by XOR-operating a common mask sequence 505 and the sequences of the BS SCHs 501, as indicated by reference numeral 503 in the same manner as illustrated in FIG. 4.

Despite the same cross correlation characteristics, the RS SCH sequences 507 have a lower PAPR performance than the BS SCH sequences 501.

To improve the PAPR performance of the RS SCH 507, each BS determines P distributed positions in its RS SCH sequence 507 at which a replacement sequence of length P will substitute. For example, the P elements of the replacement sequence substitute for as many elements of the RS SCH sequence 507, one per L elements. It can be further contemplated as another embodiment of the present invention that the P elements of the replacement sequence substitute for as many successive elements of the RS SCH sequence 507.

The base station determines the size of P according to the PAPR performance and the correlation characteristics of the RS SCH 507. As P increases, the RS SCH 507 has an improved PAPR performance but degraded correlation characteristics. On the other hand, a smaller P leads to a decreased PAPR performance but improved correlation characteristics for the RS SCH 507. Thus, the size of P depends on the PAPR performance and the correlation characteristics of the RS SCH 507.

After determining the P positions of the RS SCH 507, the base station calculates a replacement sequence of length P 511 that reduces the PAPR of the RS SCH 507. If the common mask 505 is not changed, the replacement sequence can be used constantly. For instance, if the same common mask is used for every frame, the base station uses the same replacement sequence of length P for the frame.

Then, the base station creates a final RS SCH 513 with an improved PAPR performance by substituting the P elements of the replacement sequence at the determined positions of the RS SCH 507.

The base station should transmit information about the replacement sequence of length P (referred to as replacement sequence information) to its lower relay station. The replacement sequence information specifies the number and positions of replacement elements.

The base station may transmit the replacement sequence information to the relay station by a broadcast message. If the P elements of the replacement sequence are distributed over the RS SCH 507, the base station transmits a broadcast message having the configuration illustrated in Table 4 to the relay station.

TABLE 4

| parameter | Value | description |
|---|---|---|
| P | xx bit: number | the number of replacement elements for PAPR reduction |
| A | xx bit: value | value A in allocation information about replacement elements Ak + B |
| B | xx bit: value | value B in allocation information about replacement elements Ak + B |

The broadcast message contains information about the number P of the replacement elements and information about an interval at which the P replacement elements are distributed.

As the P replacement elements are distributed at a predetermined interval, upon receipt of the broadcast message illustrated in Table 4, the relay station determines that the P replacement elements substitute for as many elements of the RS SCH sequence 507 at an interval of Ak+B where k starts from 0 in order to improve PAPR performance.

If the P replacement elements are successive in the RS SCH sequence 507, the base station transmits a broadcast message configured as illustrated in Table 5 to the relay station.

TABLE 5

| parameter | value | description |
|---|---|---|
| P | Xx bit: number | the number of replacement elements for PAPR reduction |
| S | xx bit: value | the index of the first subcarrier of replacement elements (allocation information about replacement elements) |

The broadcast message contains information about the number P of replacement elements used for improving the PAPR performance of the RS SCH 507 and information about the starting position of the P replacement elements.

Since the P replacement elements are successive, upon receipt of the broadcast message illustrated in Table 5, the lower relay station determines that the P replacement elements substitute for as many successive elements of the RS SCH sequence 507, starting from a position S in order to improve PAPR performance.

Figure 6:
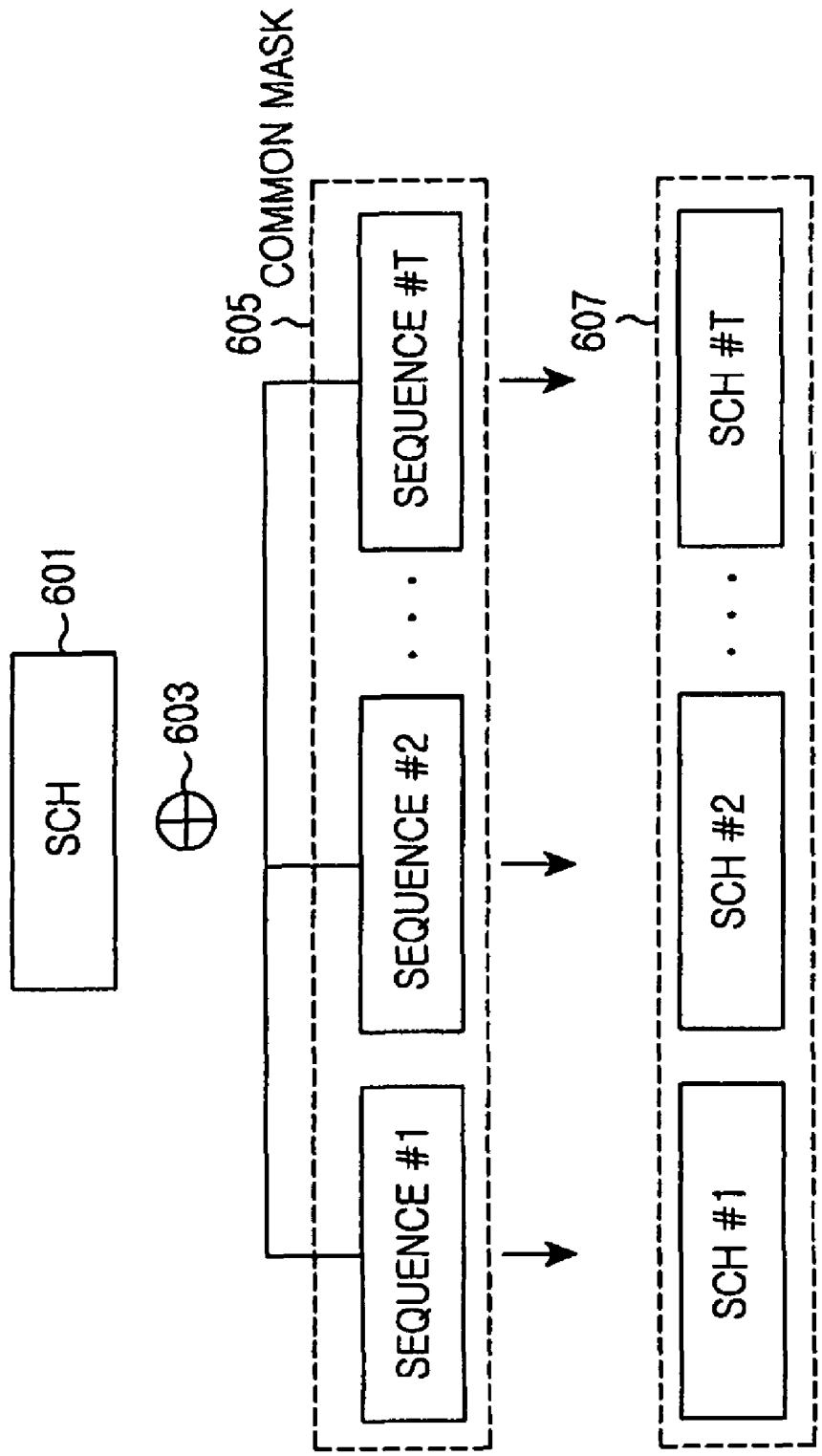
FIG. 6 illustrates a method for generating an SCH for a relay station in a base station with a directional antenna in the wireless communication system according to an embodiment of the present invention.

If the base station communicates with the relay station via a directional antenna, it can generate an RS SCH in the method illustrated in FIG. 6.

FIG. 6 illustrates a method for generating an RS SCH in a base station having a directional antenna in the wireless communication system according to an embodiment of the present invention.

Referring to FIG. 6, when the base station communicates with relay stations through the directional antenna, it needs RS SCHs according to the positions of the relay stations. Since the base station has to steer a beam in the direction to an intended RS, it requires an SCH for the beam. Hence, the base station uses T common masks 605 to generate RS SCHs for different beams. Specifically, the base station generates RS SCHs 607 by forming beams through XOR-operation between the T common masks and a BS SCH 601.

The RS SCH 607 can be used in an RS frame to be transmitted through a directional antenna. For example, if the base station covers three sectors, T RS SCHs can be used in order to steer beams on a 120/T degree basis in a 120-degree sector.

While T common masks are used to generate T RS SCHs for the directional antenna of the base station in the above-described embodiment of the present invention, it can be further contemplated as another embodiment that RS SCHs are generated for multiple respective hops using T common masks in the same manner when the wireless communication system spans the multiple hops.

Now a description will be made of an operation of a base station for generating an RS SCH using a BS SCH and a common mask and an operation of a relay station for acquiring synchronization using the RS SCH in the wireless communication system.

Figure 7:
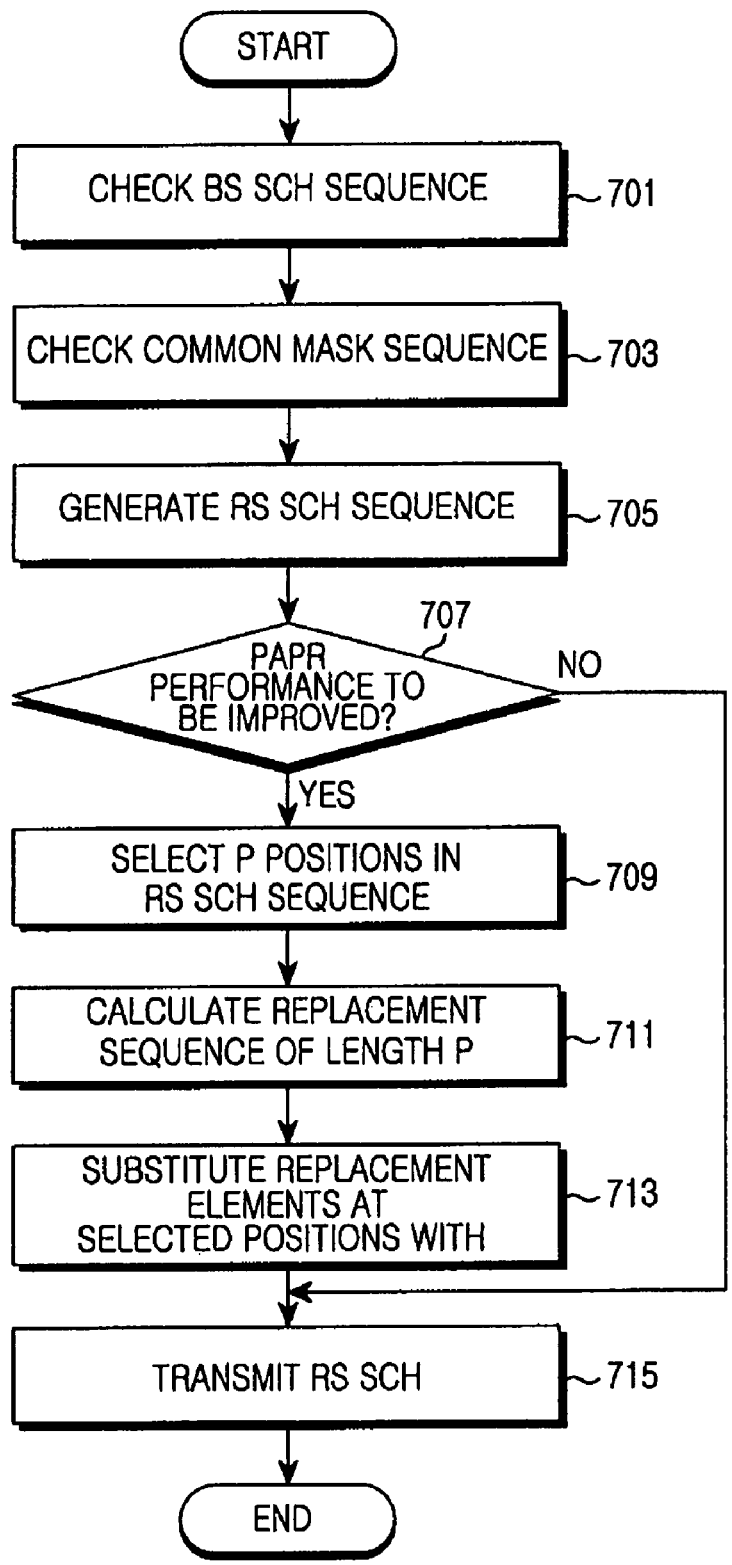
FIG. 7 is a flowchart illustrating an operation for generating and transmitting an SCH for the relay station in the BS according to an embodiment of the present invention.

FIG. 7 is a flowchart illustrating an operation for generating and transmitting an RS SCH in the base station according to an embodiment of the present invention.

Referring to FIG. 7, the base station checks the sequence of a BS SCH (the BS SCH 311 in FIG. 3) to be transmitted to mobile stations connected to the base station via direct links in step 701 and checks the sequence of a common mask in step 703. The common mask sequence may have a length equal to or different from the BS SCH sequence.

In step 705, the base station generates an RS SCH sequence by XOR-operating the BS SCH sequence with the common mask sequence. The base station then determines whether to improve the PAPR performance of the RS SCH in step 707.

If the base station determines not to improve, the base station transmits the RS SCH (e.g. the RS SCH 323 in FIG. 3) to a relay station in step 715.

If the base station determines to improve, it determines the positions of replacement elements in the RS SCH sequence in step 709. The number of the replacement elements is decided according to the PAPR performance and correlation characteristics of the RS SCH. The positions may be distributed in the RS SCH such that the replacement elements can be distributed, one per L elements of the RS SCH sequence. Alternatively, the positions may be successive.

After determining the positions of the replacement elements, the base station calculates a sequence of the replacement elements in step 711. If the same common mask is used for every frame, the base station can use an initial replacement sequence for every frame without changing it.

In step 713, the base station replaces RS SCH sequence elements at the determined positions with the calculated replacement elements.

Then the base station transmits the resulting RS SCH (e.g. the RS SCH 323 in FIG. 3) with an improved PAPR performance to the relay station in step 715.

The base station ends the algorithm of the present invention.

As described above, since the RS SCH created using the BS SCH and the common mask is poor in PAPR performance, a predetermined number of elements of the RS SCH sequence are replaced with as many replacement elements to improve the PAPR performance. The replacement sequence is a random sequence or a complementary sequence as illustrated in FIGS. 12A and 12B.

Figure 12A:
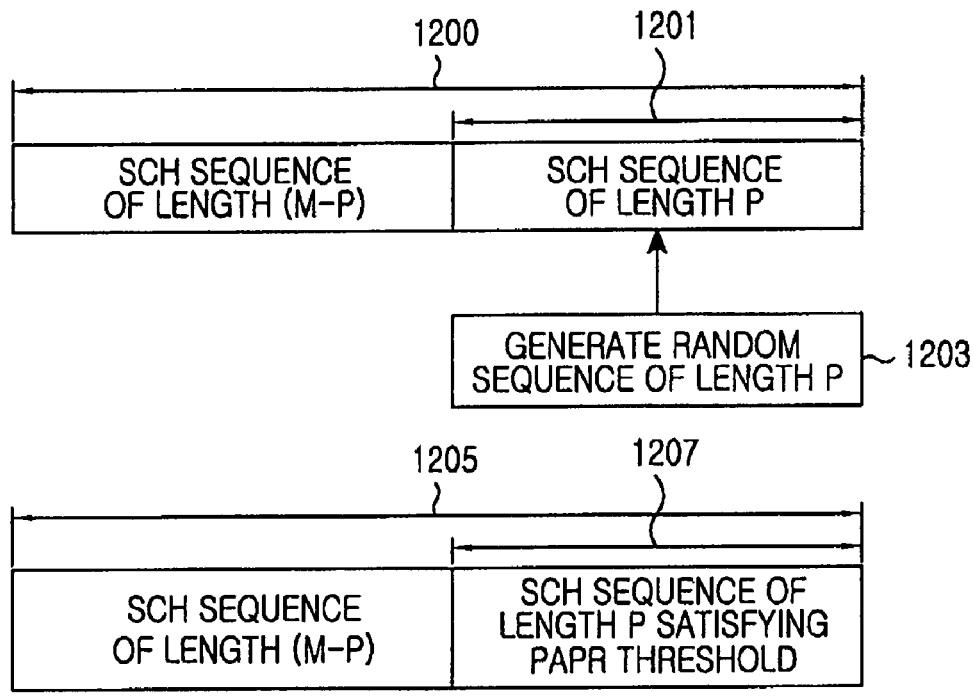
FIGS. 12A and 12B illustrate structures of an SCH for a relay station, modified to achieve a better PAPR performance according to an embodiment of the present invention.
Figure 12B:
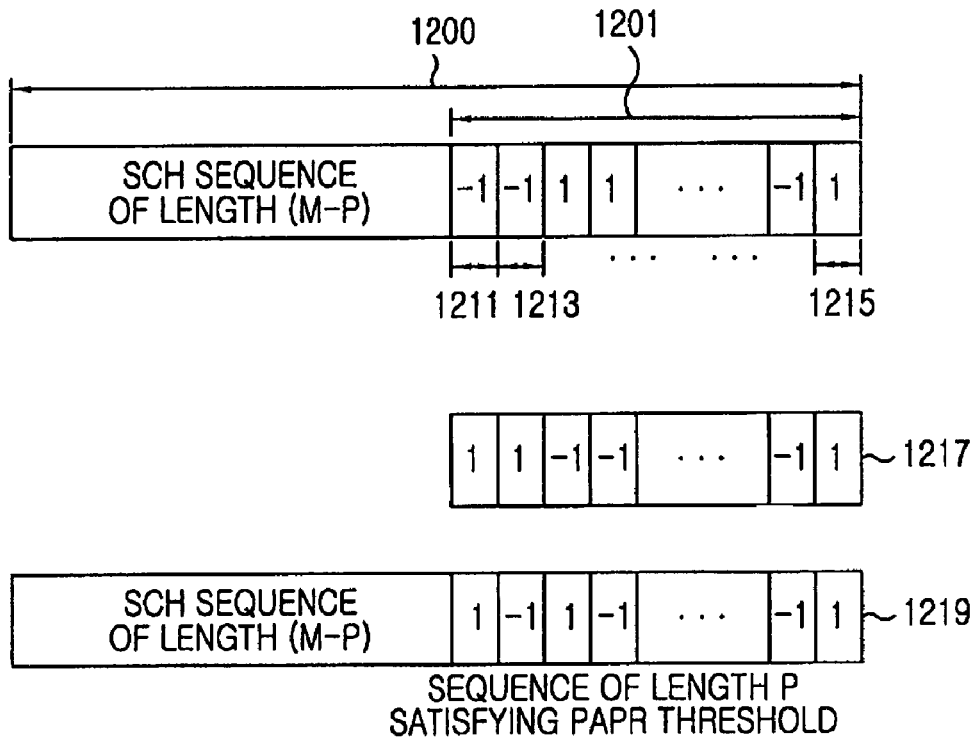

FIGS. 12A and 12B illustrate structures of an RS SCH modified to achieve better PAPR performance according to an embodiment of the present invention. FIG. 12A illustrates an RS SCH whose part is replaced with a random sequence and FIG. 12B illustrates an RS SCH whose part is replaced with a complementary sequence.

Referring to FIG. 12A, the base station determines P positions 1201 in an RS SCH 1200, generates a random sequence 1203 of length P, and substitutes the random sequence 1203 at the P positions. The base station measures the PAPR performance of the resulting RS SCH 1205 with the random sequence 1203 and compares the PAPR performance with a threshold. If the PAPR is less than the threshold, the base station uses the RS SCH 1205.

If the PAPR is higher than the threshold, the base station replaces the random sequence 1203 with another random sequence.

Referring to FIG. 12B, the base station determines the P positions 1201 in the RS SCH 1200. The base station replaces an element −1 at a first position 1211 among the positions 1201 with its complement 1 and then measures the PAPR performance of the RS SCH 1200. If the PAPR is lower than before the replacement, the base station keeps the complement 1 at the first position 1211. If the PAPR is higher than before the replacement, it recovers the original element 1 at the first position 1211. In the same manner, the base station repeats the above operation on the elements at the positions 1201, thereby improving the PAPR performance of the RS SCH.

Figure 8:
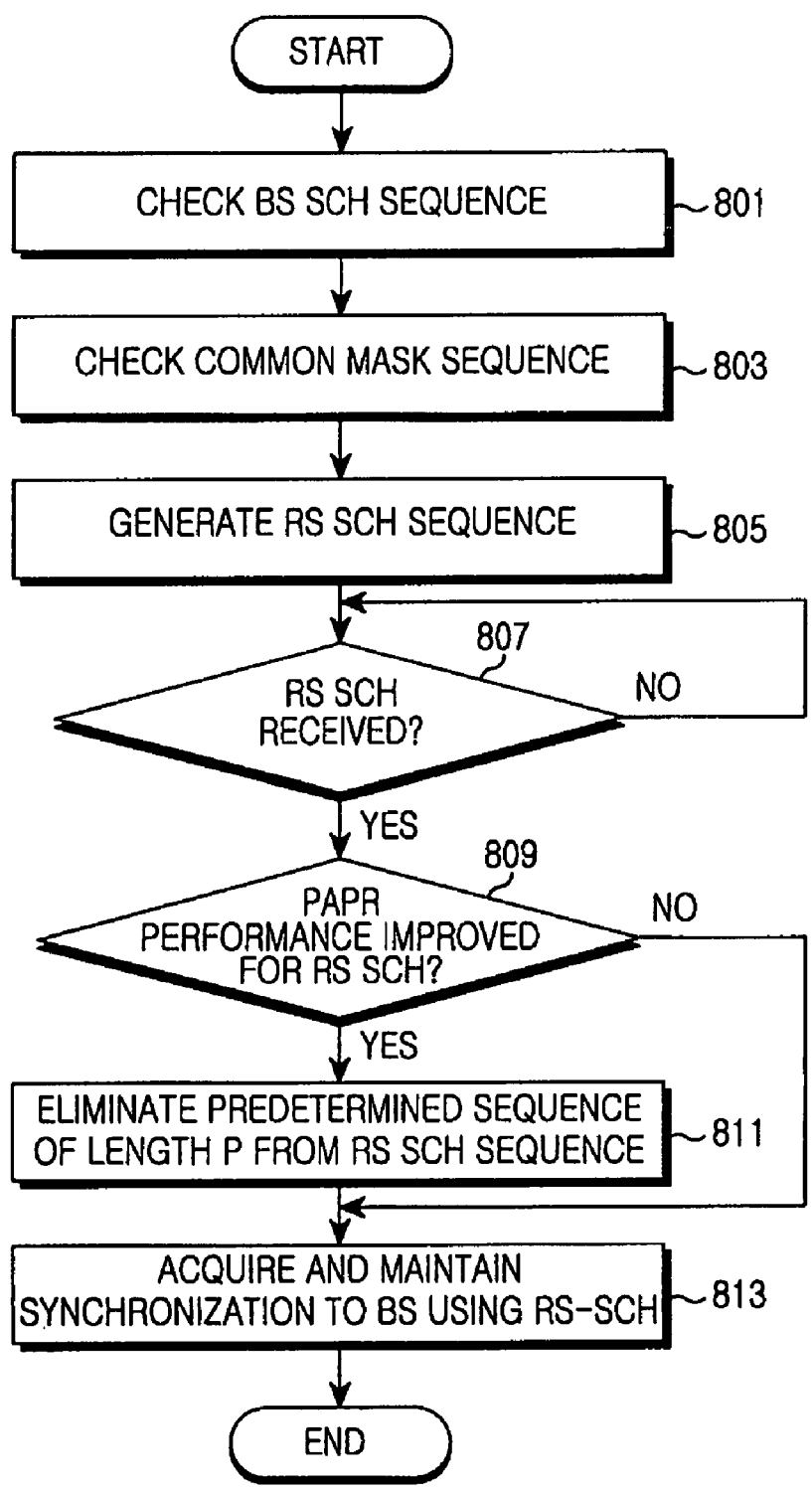
FIG. 8 is a flowchart illustrating an operation for acquiring an RS SCH in the relay station according to an embodiment of the present invention.

FIG. 8 is a flowchart illustrating an operation for acquiring an RS SCH in a relay station according to an embodiment of the present invention.

Referring to FIG. 8, the relay station checks the sequence of a BS SCH in step 801. At initial access, the relay station acquires synchronization to a base station using the BS SCH, like mobile stations. Therefore, the relay station can check the BS SCH sequence acquired during the initial access.

In step 803, the relay station checks a stored sequence of a common mask to generate an RS SCH. The common mask is identical to that used in generating the RS SCH by the base station. The common mask sequence may have a length equal to or different from that of the BS SCH sequence.

The relay station generates the RS SCH sequence by XOR-operating the BS SCH sequence with the common mask sequence and stores the RS SCH sequence in step 805.

In step 807, the relay station monitors reception of an RS SCH. Upon receipt of the RS SCH, the relay station determines whether the base station improved the PAPR performance of the RS SCH by a DL-MAP or a Downlink Channel Descriptor (DCD) received from the base station in step 809.

If the base station did not, the relay station maintains synchronization to the base station using the received RS SCH sequence by correlating the received RS SCH with the generated RS SCH.

If the base station did, the relay station eliminates a predetermined sequence from both the received RS SCH and the generated RS SCH in step 811. The predetermined sequence is identical to a replacement sequence used in the base station. If the replacement sequence is very short, the relay station may not perform the sequence elimination.

In step 813, the relay station maintains synchronization to the base station by correlating the sequence-eliminated received RS SCH with the sequence-eliminated generated RS SCH.

Then the relay station ends the algorithm.

Now a description will be made below of a base station apparatus for generating an RS SCH using a BS SCH and a common mask, and a relay station apparatus for acquiring synchronization using the RS SCH.

Figure 9:
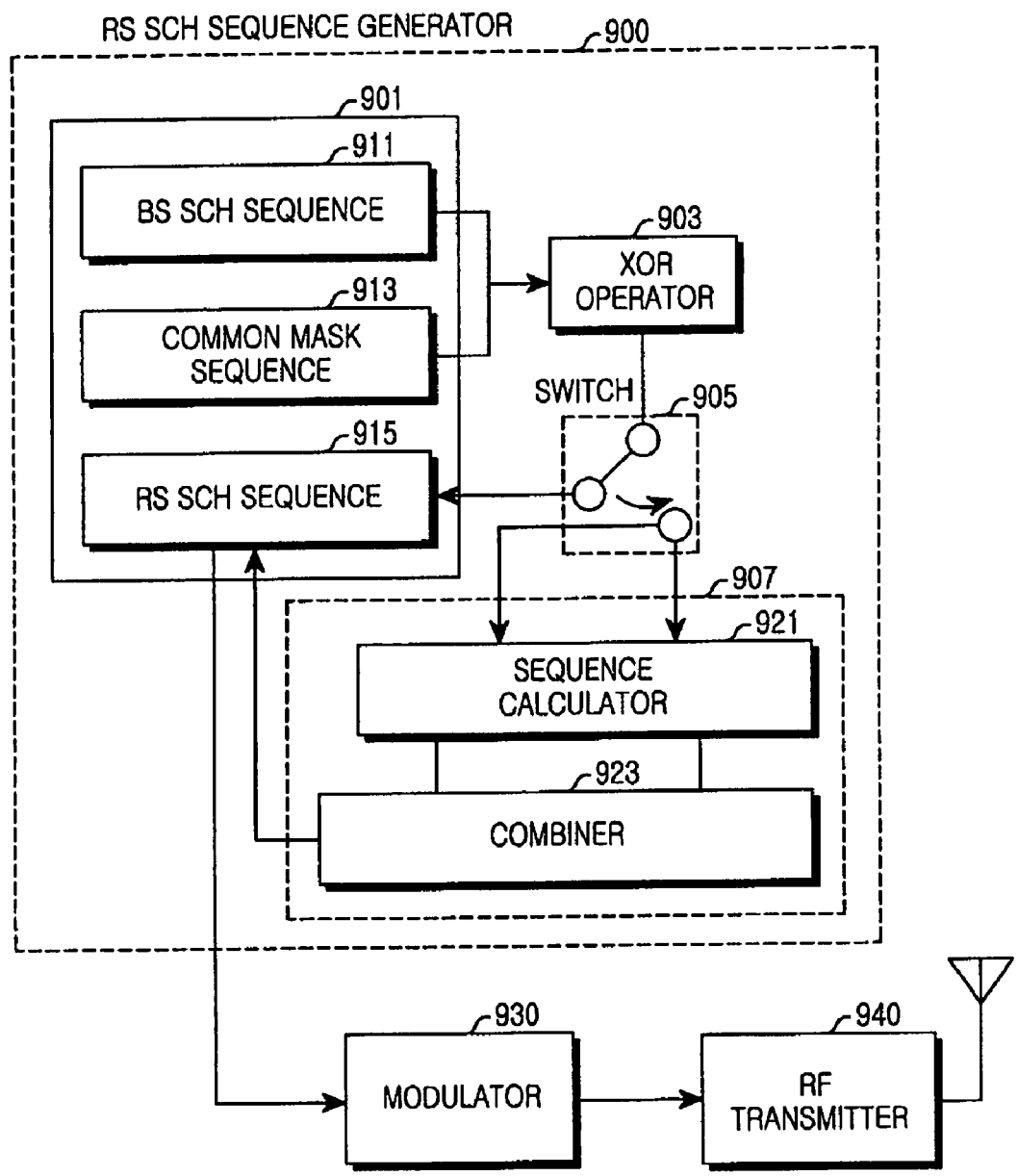
FIG. 9 is a block diagram of the BS for generating an SCH for a relay station according to an embodiment of the present invention.

FIG. 9 is a block diagram of the base station for generating an RS SCH according to an embodiment of the present invention. While the following description is made in the context of the base station, the same thing applied to an upper relay station when it generates an RS SCH for a lower relay station.

Referring to FIG. 9, the base station includes an RS SCH sequence generator 900, a modulator 930, and a Radio Frequency (RF) transmitter 940.

The RS SCH sequence generator 900 has a storage 901, an XOR operator 903, a switch 905, and a PAPR controller 907.

The storage 901 stores a BS SCH sequence 911 and a common mask sequence 913. The storage 901 also stores an RS SCH sequence 915 generated from the XOR operator 903 or the PAPR controller 907.

The XOR operator 903 generates an RS SCH sequence by XOR-operating the BS SCH sequence 911 and the common mask sequence 913.

The switch 905 switches the RS SCH sequence to the storage 901 or the PAPR controller 907 according to whether the PAPR performance of the RS SCH sequence is to be improved. If the PAPR performance of the RS SCH sequence is to be improved, the switch 905 switches the RS SCH sequence to the PAPR controller 907. If the PAPR performance of the RS SCH sequence does not need to be improved, the switch 905 switches the RS SCH sequence to the storage 901.

The PAPR controller 907 includes a sequence calculator 921 and a combiner 923, for improving the PAPR performance of the received RS SCH.

The sequence calculator 921 determines the number of replacement elements according to the PAPR performance and correlation characteristics of the RS SCH and selects as many positions as the number of replacement elements in the RS SCH sequence. The positions are distributed, one per L elements of the RS SCH sequence, or they are successive.

The sequence calculator 921 then calculates a sequence of the replacement elements. The replacement sequence can be a random sequence or a complementary sequence.

The combiner 923 generates an RS SCH with an improved PAPR performance by substituting the replacement elements at the selected positions of the RS SCH sequence, and provides the generated RS SCH sequence to the storage 901.

The modulator 930 modulates the RS SCH 915 received from the storage 901 in a predetermined modulation scheme (e.g. an Modulation and Coding Scheme (MCS) level).

The RF transmitter 940 upconverts the baseband RS SCH received from the modulator 903 to an RF signal and transmits the RF signal to a relay station via an antenna.

Figure 10:
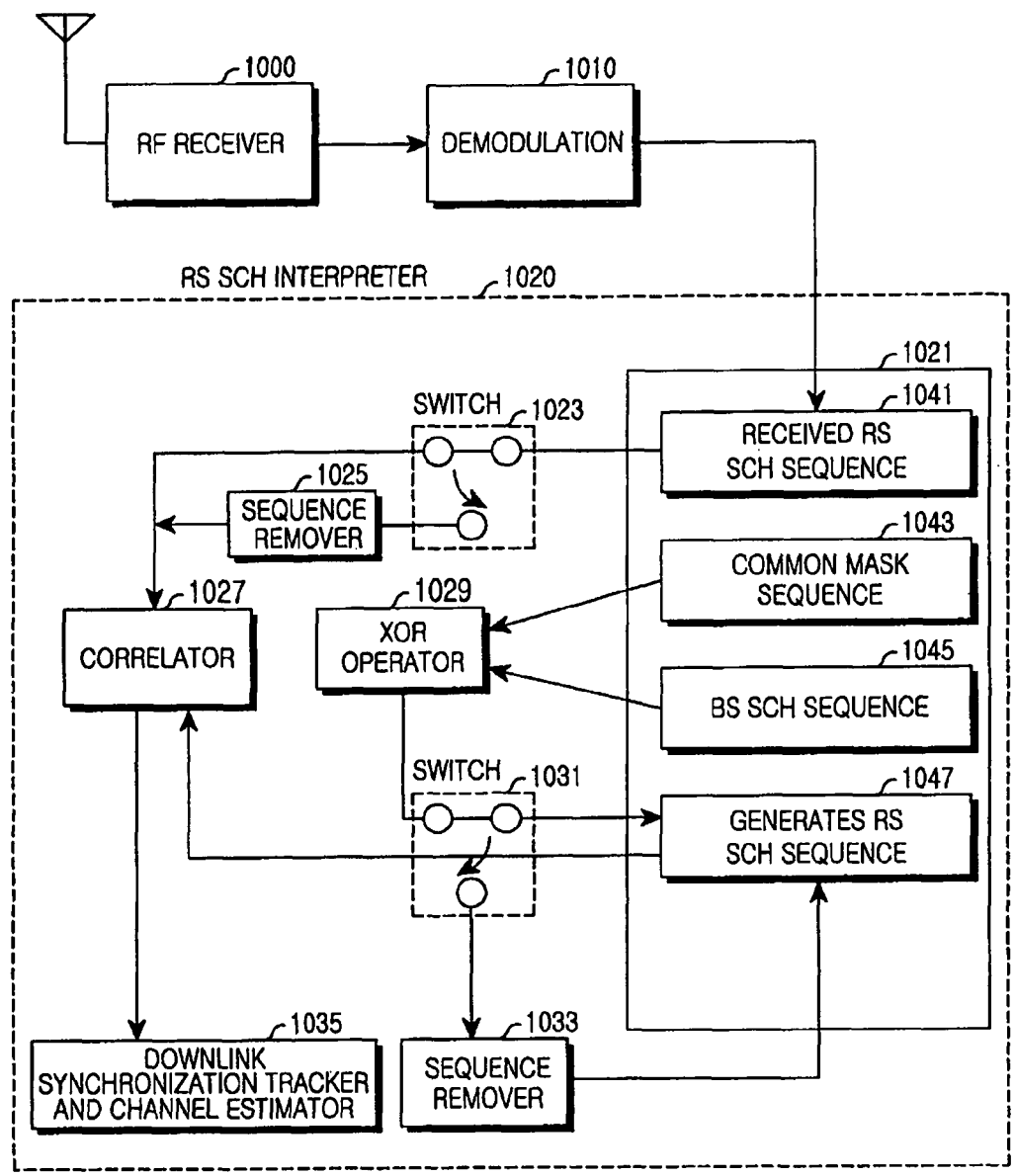
FIG. 10 is a block diagram of the relay station for acquiring an RS SCH according to an embodiment of the present invention.

FIG. 10 is a block diagram of the relay station for acquiring an RS SCH according to an embodiment of the present invention.

Referring to FIG. 10, the relay station includes an RF receiver 1000, a demodulator 1010, and an RS SCH interpreter 1020.

The RF receiver 1000 downconverts an RF signal received through an antenna to a baseband signal and converts the baseband analog signal to a digital signal. The demodulator 1010 detects an RS SCH sequence 1041 by demodulating the digital signal in accordance with a predetermined modulation scheme (e.g. an MCS level).

The RS SCH interpreter 1020 includes a storage 1021, first and second switches 1023 and 1031, a first sequence remover 1025, a correlator 1027, an XOR operator 1029, a second sequence remover 1033, and a downlink synchronization tracker and channel estimator 1035.

The storage 1021 stores the RS SCH sequence 1041, a predetermined common mask sequence 1043, and a BS SCH sequence 1045 acquired during initial registration to a base station. The storage 1021 also stores an RS SCH sequence 1047 generated from the XOR operator 1029 or the second sequence remover 1033.

The first switch 1023 switches the RS SCH sequence 1041 to the correlator 1027 or the first sequence remover 1025 according to whether the RS SCH sequence 1041 has an improved PAPR performance. If the RS SCH sequence 1041 has an improved PAPR performance, the first switch 1023 switches the RS SCH sequence 1041 to the first sequence remover 1025. If the RS SCH sequence 1041 does not have an improved PAPR performance, the first switch 1023 switches the RS SCH sequence 1041 to the correlator 1027.

The first sequence remover 1025 removes a replacement sequence from the RS SCH sequence 1041 and provides the resulting RS SCH sequence to the correlator 1027. If the replacement sequence is very short, the sequence elimination of the first sequence remover 1025 may not be performed.

The XOR operator 1029 generates an RS SCH sequence by XOR-operating the BS SCH sequence 1045 with the common mask sequence 1047.

The second switch 1031 switches the generated RS SCH sequence to the storage 1021 or the second sequence remover 1033 according to whether the received RS SCH sequence 1041 has an improved PAPR performance. If the RS SCH sequence 1041 has an improved PAPR performance, the second switch 1031 switches the generated RS SCH sequence to the second sequence remover 1033. If the RS SCH sequence 1041 does not have an improved PAPR performance, the second switch 1031 switches the generated RS SCH sequence 1047 to the storage 1021.

The second sequence remover 1033 removes the replacement sequence from the RS SCH sequence received from the second switch 1031 and provides the resulting RS SCH sequence to the storage 1021.

The correlator 1027 searches for an accurate RS SCH by correlating the received RS SCH received from the storage 1021 or the first sequence remover 1025 with the generated RS SCH 1047 received from the storage 1021. If the base station has not improved the PAPR performance of the RS SCH, the correlator 1027 correlates the RS SCH 1041 with the generated RS SCH. If the base station has improved the PAPR performance of the RS SCH, the correlator 1027 correlates the RS SCH received from the first sequence remover 1025 with the RS SCH received from the second sequence remover 1033.

The downlink synchronization tracker and channel estimator 1035 acquires information required for downlink synchronization to the base station or performs channel estimation using RS SCH information received from the correlator 1027.

In the wireless communication system, communications are conducted among a base station, a relay station and a mobile station in frames having the configuration illustrated in FIG. 3. As the first and second zones are dynamically allocated according to the loads of the base station and the mobile station in the frame, an RS SCH is positioned at the end of the second zone. Yet, the position of the RS SCH can be changed as illustrated in FIGS. 11A, 11B and 11C.

Figure 11A:
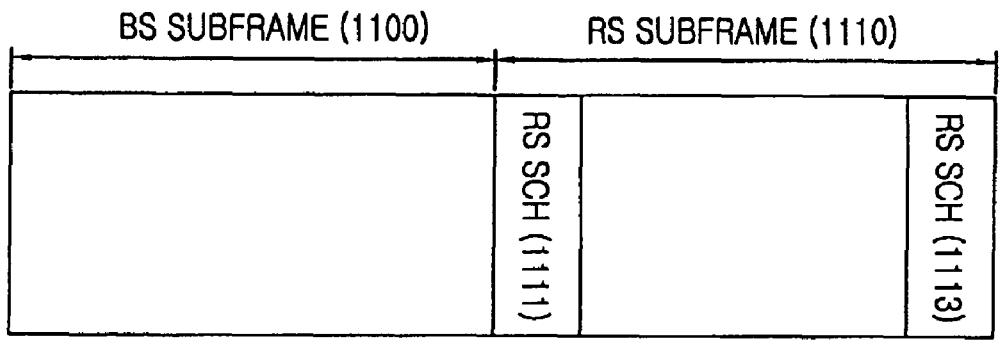
FIGS. 11A, 11B and 11C illustrate transmission positions of an SCH for a relay station in the wireless communication system according to embodiments of the present invention.
Figure 11B:
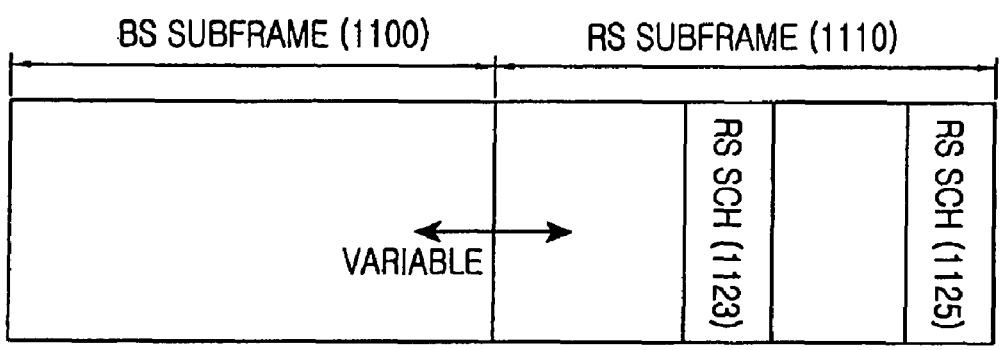
Figure 11C:
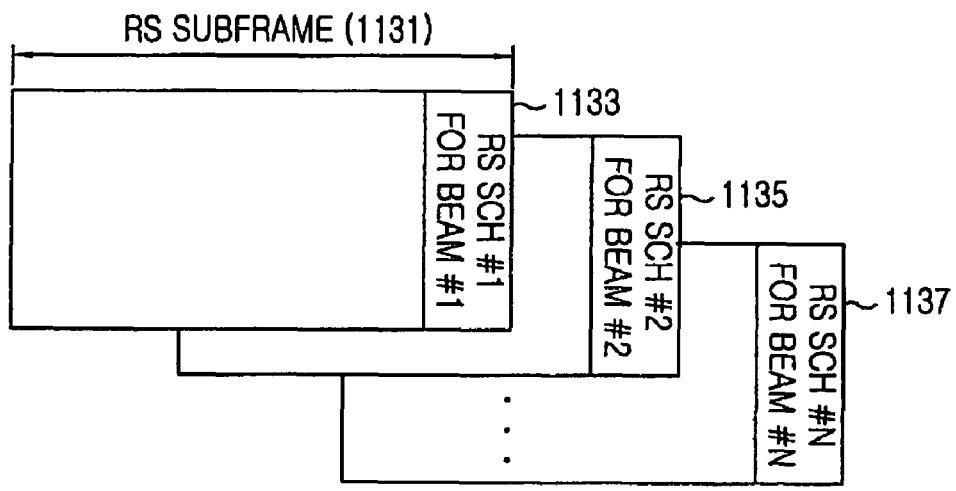

FIGS. 11A, 11B and 11C illustrate transmission positions of an RS SCH in the wireless communication system according to embodiments of the present invention. FIG. 11A illustrates a position of the RS SCH when the first and second zones are fixed in the frame, FIG. 11B illustrates a position of the RS SCH when the first and second zones are variable in the frame, and FIG. 11C illustrates a position of the RS SCH in the case of beamforming. The frame includes a BS subframe 1100 for communications from a base station and a relay station to mobile stations and an RS subframe 1110 for communications from the base station and the relay station to lower relay stations.

Referring to FIG. 11A, if the lengths of the BS subframe 1100 and the RS subframe 1110 are fixed, the RS SCH is fixedly positioned at the start 1111 or end 1113 of the RS subframe 1110.

Referring to FIG. 11B, if the lengths of the BS subframe 1100 and the RS subframe 1110 are variable, the RS SCH is positioned at the end 1125 of the RS subframe 1110. If the base station notifies a relay station of the position of the RS SCH by control information such as a MAP, the RS SCH can be dynamically positioned, as indicated by reference numeral 1123.

Referring to FIG. 11C, when the base station communicates with relay stations by beamforming, RS subframes can be spatially multiplexed. Therefore, RS subframes 1131 have RS SCHs 1133, 1135 and 1137. Even though the RS SCHs 1133, 1135 and 1137 may differ in space, they should be positioned at the same time position. If the wireless communication system spans multiple hops, each RS can transmit a different RS SCH to its lower relay station in the manner illustrated in FIG. 11C.

As described above, a base station or an upper relay station generates an RS SCH by XOR-operating a BS SCH with a common mask in the multi-hop relay wireless communication system.

If the wireless communication system adopts IEEE 802.16 OFDMA, it can generate an RS SCH as follows. While the following description is made of generation of an RS SCH in the context of a base station, the same thing applies to an upper relay station when it generates an RS SCH.

In the IEEE 802.16 system, 114 preambles are available. The preambles are equivalent to BS SCHs by which mobile stations within service areas can acquire synchronization. Therefore, a base station can generate an RS SCH using a preamble and a common mask.

The common mask can be a newly defined sequence, a common PN sequence, or a common sync symbol sequence.

Figure 15:
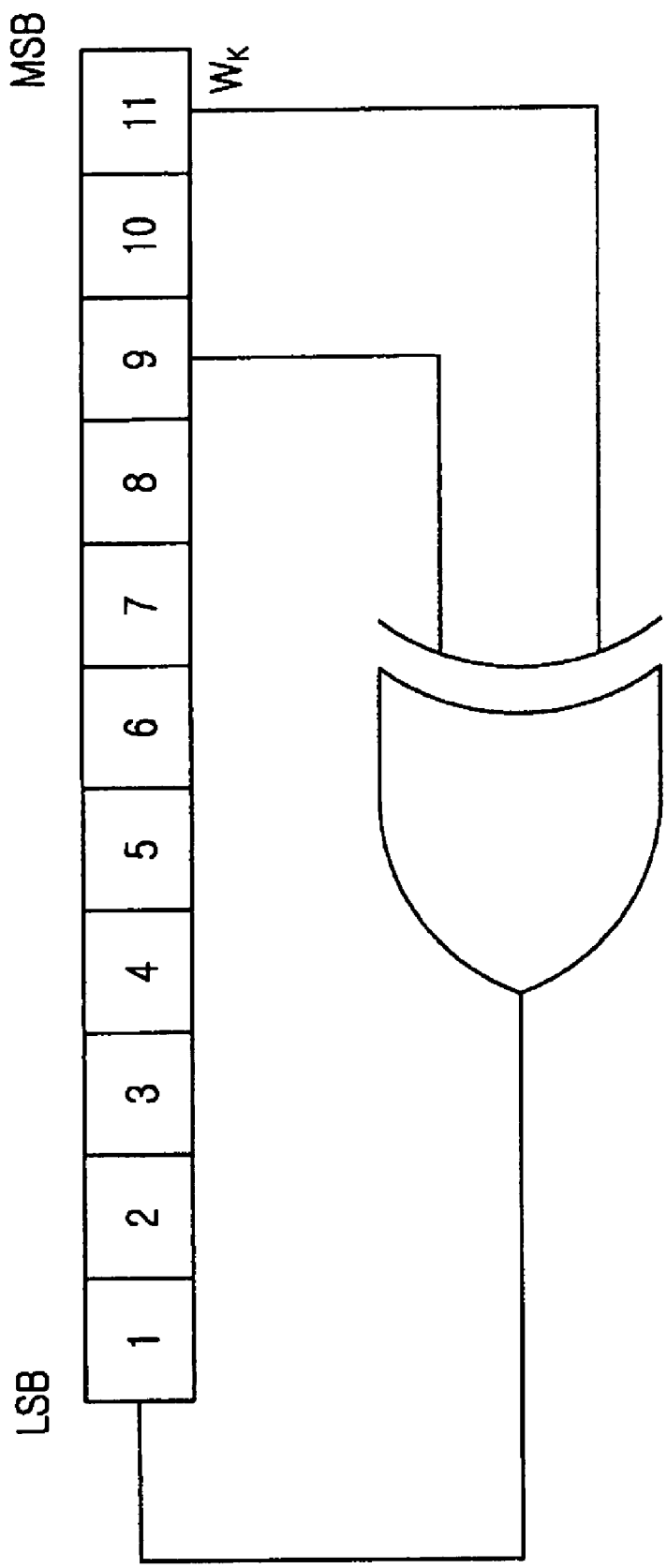
FIG. 15 illustrates the structure of a common PN sequence generator according to an embodiment of the present invention.

The common PN sequence is a pilot sequence carried on a data channel, which is generated in a Pseudo Random Binary Sequence (PRBS) generator having the configuration illustrated in FIG. 15.

FIG. 15 illustrates the structure of a common PN sequence generator (PRBS generator) according to an embodiment of the present invention.

Referring to FIG. 15, the PRBS generator has basic 11-bit information by which to generate a common PN sequence. Bit #1 to bit #5 in the 11-bit information represents a cell Identification (ID) and bits #6 and #7 represent a segment number. Bit #8 to Bit #11 are fixed to 1111 for the downlink and to the last 4 bits of a frame number for the uplink.

The PRBS generator generates a first bit value by XOR-operating the 9$^{th}$ and 11$^{th}$ bits of the information. The basic 11 bits are shifted in the direction of the Most Significant Bit (MSB). In FIG. 15, $W_k$ denotes the 11$^{th}$ bit. Hence $W_0$ denotes the initial 11$^{th}$ bit and $W_1$ denotes the 11$^{th}$ bit after one shift.

station. Since the relay station has a PRBS generator for generating a pilot sequence to be included in a data channel, it can generate an RS SCH for a lower relay station using a common PN sequence generated in the PRBS generator.

As to a common sync symbol sequence as a common mask, the common sync symbol is a sync symbol sequence common to all base stations. Besides a preamble, the common sync symbol sequence is transmitted every 4 frames to enable mobile stations that have difficulties in acquiring synchronization to a weak preamble to acquire synchronization. The common sync symbol sequence is positioned in the last OFDM symbol of a downlink subframe in a frame. The common sync symbol is defined in the IEEE 802.16e standard as illustrated in Table 6.

TABLE 6

| NFFT | Sequence | PAPR (dB) | NLEFT-FFT | NRIGHT-FFT |
|---|---|---|---|---|
| 1024 | 0x473A0B21CE9537F3A0B20316AC873A0B 21CE95378 C5F4DFCE9537F3A0B21CE9537F3A0B2031 6AC80C5F4 DE316AC873A0B20316AC800 | 3.32 | 87 | 86 |
| 512 | 0x5642862D90FE75642862A6F018B642862 D90FE749BD 79D590FE740 | 3.17 | 43 | 43 |
| 128 | 0x590A18B643F9D0 | 2.89 | 11 | 11 |

As described above, the base station generates an RS SCH using a common PN sequence generated from the PRBS generator as a common mask. The length of the preamble varies with a Fast Fourier Transform (FFT) size. Hence, the base station generates a common PN sequence as long as the preamble in the PRBS generator. Given an FFT size of 2048, the preamble is of length 568. Therefore, the PRBS generator generates a common PN sequence with $W_0$ to $W_{567}$. The base station then generates an RS SCH by XOR-operating the common PN sequence with the preamble.

To improve the PAPR performance of the RS SCH, the base station can replace P elements of the RS SCH sequence with as many elements with other values.

If the base station uses a common PN sequence as the common mask, it can generate the common PN sequence that is cyclically shifted according to the start symbol position of the RS SCH.

When the wireless communication system spans three or more hops, as the second zone of a frame is divided into a plurality of areas, there can be a plurality of RS SCHs in the second zone. To distinguish the RS SCHs, different common masks should be used. Hence, the base station generates a different common mask by cyclically shifting a common PN sequence according to the start symbol position of the RS SCH. The start symbol position of the RS SCH is decided according to the start of the downlink frame, the second zone, or a sub-channel zone.

For example, if the start symbol position of the RS SCH is decided according to the start of the sub-channel zone and it is a 10$^{th}$ OFDM symbol, the PRBS generator generates a common PN sequence with $W_9$ to $W_{576}$, $W_9$ being created by 10 cyclic shifts from $W_0$.

The base station can generate an RS SCH with an improved PAPR performance by replacing P elements of an RS SCH generated using the common PN sequence with other values.

In the IEEE 8802.16 system, a relay station uses a preamble of a length equal to that of the preamble used by the base As noted from Table 6, a common sync symbol sequence of a different length is defined according to the FFT size of the base station.

The common sync symbol sequence is longer than a BS SCH sequence. Therefore, the base station takes as many symbols of the common sync symbol sequence as the length of the BS SCH sequence, for use as the common mask.

The base station can generate an RS SCH with an improved PAPR performance by replacing P elements of an RS SCH generated using the common sync symbol sequence with other values.

In another embodiment of the present invention, the sequence of the common mask can be set to all 0s. That is, the values $W_k$ of the common PN sequence are all 0s or the common sync symbol sequence is all 0s.

As a consequence, an RS SCH generated by XOR-operating the common mask with all 0s and a BS SCH becomes identical to the BS SCH.

As described above, the base station and the upper relay station can configure a common mask with a common PN sequence or a common sync symbol sequence and notify lower relay stations of the type of the common mask by a broadcast message. If the common PN sequence is used, the base station and the upper relay station can generate a PN sequence as the common mask through the PRBS generator and notify the lower relay stations of basic 11-bit information used for generating the PN sequence by a broadcast message. Alternatively, the base station and the upper relay station may transmit the common PN sequence to the lower relay stations.

As is apparent from the above description, a base station generates an RS SCH using a BS SCH sequence and a common mask sequence in a wireless relay communication system. Therefore, the BS SCH is distinguished from the RS SCH and the complexity of generating the RS SCH is decreased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for generating a Synchronization CHannel (SCH) in an upper node in a wireless communication system, the method comprising:
   checking, by the upper node, a sequence of a first SCH being an SCH for a mobile station (MS) and a mask sequence; and
   generating a sequence of a second SCH being an SCH for a relay station (RS) by XOR-operating the first SCH sequence and the mask sequence.

2. The method of claim 1, wherein the mask sequence is a sequence that minimizes the Peak-to-Average Power Ratio (PAPR) of the second SCH.

3. The method of claim 1, wherein the mask sequence is one of a common Pseudo Noise (PN) sequence, a common sync symbol sequence, and a sequence of all 0s.

4. The method of claim 3, wherein the common PN sequence is one of a sequence having a length equal to a length of the first SCH sequence, generated at a Pseudo Random Binary Sequence (PRBS) generator and cyclically shifted according to a start symbol position of the second SCH.

5. The method of claim 3, wherein the common sync symbol sequence has a length equal to a length of the first SCH sequence.

6. The method of claim 1, further comprising transmitting information about the mask sequence to a lower relay station by a broadcast message.

7. The method of claim 1, further comprising:
   determining whether to improve the Peak to Average Power Ratio (PAPR) performance of the second SCH;
   selecting replacement positions in the second SCH sequence if it is determined to improve the PAPR performance of the second SCH;
   calculating replacement elements to substitute at the replacement positions;
   substituting the replacement elements at the replacement positions of the second SCH sequence; and
   transmitting the second SCH with the replacement elements to the relay station.

8. The method of claim 7, wherein the number of the replacement elements is determined according to the PAPR performance and correlation characteristics of the second SCH.

9. The method of claim 7, wherein the substitution comprises:
   substituting the calculated replacement elements for elements of the second SCH sequence at the replacement positions;
   comparing the PAPR of the second SCH with the replacement elements with a threshold;
   re-generating replacement elements, if the PAPR is higher than the threshold; and
   transmitting the second SCH with the replacement elements to the relay station if the PAPR is lower than the threshold.

10. The method of claim 7, wherein the substitution comprises:
    changing the value of an $i^{th}$ element at one of the replacement positions in the second SCH sequence and measuring the PAPR of the second SCH with the $i_{th}$ element having the changed value;
    changing the value of an $(i+1)^{th}$ element at one of the replacement positions in the second SCH sequence and measuring the PAPR of the second SCH with the $(i+1)^{th}$ element having the changed value, if the PAPR is lower than before the value change of the $i_{th}$ element; and
    recovering an original value of the $i^{th}$ element, if the PAPR is higher than before the value change of the $i^{th}$ element. wherein i is an integer.

11. The method of claim 7, further comprising transmitting information about the replacement positions to the relay station by a broadcast message.

12. The method of claim 1, wherein the upper node is one of a base station and an upper relay station.

13. An apparatus for generating a Synchronization CHannel (SCH) for a relay station (RS) in a wireless communication system, the apparatus comprising:
    a storage configured to store a sequence of a first SCH being an SCH for a mobile station (MS) and a mask sequence; and
    an SCH generator configured to generate a sequence of a second SCH being an SCH for a relay station by XOR-operating the first SCH sequence and the mask sequence.

14. The apparatus of claim 13, wherein the mask sequence is a sequence that minimizes the Peak-to-Average Power Ratio (PAPR) of the second SCH.

15. The apparatus of claim 13, wherein the mask sequence is one of a common Pseudo Noise (PN) sequence, a common sync symbol sequence, and a sequence of all 0s.

16. The apparatus of claim 13, further comprising a Peak to Average Power Ratio (PAPR) controller configured to substitute replacement elements for elements of the second SCH sequence to improve the PAPR performance of the second SCH.

17. The apparatus of claim 16, wherein the PAPR controller comprises:
    a replacement sequence calculator configured to determine replacement positions in the second SCH sequence and calculate a sequence of the replacement elements; and
    an element exchanger configured to substitute the replacements elements at the replacement positions of the second SCH sequence.

18. A method for acquiring a Synchronization CHannel (SCH) in a relay station (RS) in a wireless communication system, the method comprising:
    checking, by the relay station. a sequence of a first SCH being an SCH for a mobile station (MS) received from an upper node and a mask sequence;
    generating a sequence of a second SCH being an SCH for a relay station by XOR-operating the first SCH sequence and the mask sequence; and
    acquiring, upon receipt of a second SCH from the upper node, synchronization to the upper node by correlating the generated second SCH with the received second SCH.

19. The method of claim 18, wherein the upper node is one of a base station (BS) and an upper relay station.

20. The method of claim 18, wherein the first SCH sequence is received from the upper node during initial access.

21. The method of claim 18, wherein the mask sequence is one of a common Pseudo Noise (PN) sequence, a common sync symbol sequence, and a sequence of all 0s.

22. The method of claim 21, wherein the common PN sequence is one of a sequence having a length equal to a length of the first SCH sequence, generated at a Pseudo Random Binary Sequence (PRBS) generator and cyclically shifted according to a start symbol position of the second SCH.

23. The method of claim 18, further comprising:
determining whether the Peak-to-Average Power Ratio (PAPR) performance of the received second SCH was improved;
determining positions of replacement elements used to improve the PAPR performance by the upper node, if the PAPR performance of the received second SCH was improved; and
removing the replacement elements from the received second SCH sequence and the generated second SCH sequence,
whereby acquiring synchronization to the upper node by correlating the received second SCH sequence without the replacement elements and the generated second SCH sequence without the replacement elements.

24. The method of claim 23, wherein the determination as to the PAPR performance improvement comprises determining whether the PAPR performance of the received second SCH was improved by control information received from the upper node.

25. The method of claim 23, wherein if the PAPR performance of the received second SCH was not improved, the received second SCH sequence is correlated with the generated second SCH sequence.

26. An apparatus for acquiring a Synchronization CHannel (SCH) in a relay station (RS) in a wireless communication system, the apparatus comprising:
a storage configured to store a sequence of a first SCH being an SCH for a mobile station (MS) received from an upper node and a mask sequence;
an SCH generator configured to generate a sequence of a second SCH being an SCH for a relay station by XOR-operating the stored first SCH sequence and the stored mask sequence;
a receiver configured to receive a second SCH from the upper node; and
a correlator configured to correlate the generated second SCH with the received second SCH.

27. The apparatus of claim 26, wherein the upper node is one of a base station (BS) and an upper relay station.

28. The apparatus of claim 26, wherein the mask sequence is one of a common Pseudo Noise (PN) sequence, a common sync symbol sequence, and a sequence of all 0s.

29. The apparatus of claim 26, further comprising a sequence remover for removing elements from both the received second SCH sequence and the generated second SCH sequence, if the Peak-to-Average Power Ratio (PAPR) performance of the received second SCH was improved,
wherein the correlator correlates the element-removed received second SCH sequence and the element-removed generated second SCH sequence.

30. The apparatus of claim 29, wherein the positions of the eliminated elements have the same values and the same positions as elements that the upper node substituted in the second SCH sequence to improve the PAPR performance.

* * * * *